US012057787B2

(12) United States Patent
Kajiyama et al.

(10) Patent No.: US 12,057,787 B2
(45) Date of Patent: Aug. 6, 2024

(54) POWER CONVERSION DEVICE

(71) Applicant: Mitsubishi Electric Corporation, Tokyo (JP)

(72) Inventors: Takuya Kajiyama, Tokyo (JP); Toshiyuki Fujii, Tokyo (JP); Shuhei Fujiwara, Tokyo (JP); Ryosuke Uda, Tokyo (JP); Yoshiyuki Kono, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 206 days.

(21) Appl. No.: 17/793,697

(22) PCT Filed: Mar. 11, 2020

(86) PCT No.: PCT/JP2020/010632
§ 371 (c)(1),
(2) Date: Jul. 19, 2022

(87) PCT Pub. No.: WO2021/181582
PCT Pub. Date: Sep. 16, 2021

(65) Prior Publication Data
US 2023/0066656 A1 Mar. 2, 2023

(51) Int. Cl.
*H02M 7/49* (2007.01)
*H02M 7/217* (2006.01)
*H02M 1/00* (2006.01)

(52) U.S. Cl.
CPC ............. *H02M 7/49* (2013.01); *H02M 7/217* (2013.01); *H02M 1/0009* (2021.05)

(58) Field of Classification Search
CPC ........ H02M 7/49; H02M 7/217; H02M 7/493; H02M 7/497; H02M 7/507; H02M 7/487;
(Continued)

(56) References Cited

U.S. PATENT DOCUMENTS

2011/0019442 A1* 1/2011 Yamada .............. H02M 7/4835 363/44
2017/0110977 A1* 4/2017 Mihalache .............. H02M 7/49
(Continued)

FOREIGN PATENT DOCUMENTS

JP 6509352 B2 5/2019

OTHER PUBLICATIONS

International Search Report (PCT/ISA/210) with translation and Written Opinion (PCT/ISA/237) mailed on Jun. 2, 2020, by the Japan Patent Office as the International Searching Authority for International Application No. PCT/JP2020/010632. (8 pages).
(Continued)

*Primary Examiner* — Nguyen Tran
(74) *Attorney, Agent, or Firm* — BUCHANAN, INGERSOLL & ROONEY PC

(57) ABSTRACT

A power conversion device includes a power conversion circuit unit including a plurality of leg circuits, and a control device. Each of the leg circuits includes a plurality of first converter cells each having a capacitor and connected in series to each other and a plurality of second converter cells each having the capacitor and connected in series to each other. The plurality of first converter cells are controlled not based on a circulating current circulating between the plurality of leg circuits, and the plurality of second converter cells are controlled based on the circulating current. The control device stops a switching operation of at least one second converter cell in the plurality of second converter cells when a voltage at the capacitor in the second converter cell becomes less than a first threshold.

20 Claims, 8 Drawing Sheets

(58) Field of Classification Search
CPC ........ H02M 7/483; H02M 7/219; H02M 7/23; H02M 7/25; H02M 1/0009; H02M 1/0006
See application file for complete search history.

(56) References Cited

U.S. PATENT DOCUMENTS

2019/0044427 A1 2/2019 Fujii et al.
2023/0027927 A1 * 1/2023 Imada .................. H02M 7/483

OTHER PUBLICATIONS

Extended European Search Report dated Mar. 13, 2023, issued in the corresponding European Patent Application No. 20923752.8, 9 pages.

* cited by examiner

POWER CONVERSION DEVICE

TECHNICAL FIELD

The present disclosure relates to a power conversion device that performs power conversion between an alternating current and a direct current.

BACKGROUND ART

A modular multilevel converter (hereinafter, also referred to as an MMC converter) in which a plurality of unit converters are connected in cascade can easily cope with an increase in voltage by increasing the number of unit converters. The "unit converter" is also referred to as a "converter cell" or a "sub-module". The MMC converter is widely applied to a transmission and distribution system as a large-capacity static reactive power compensator or an AC-DC power conversion device for high-voltage DC power transmission. The converter cell includes a plurality of switching elements and a power storage element, and is configured of a chopper circuit, a bridge circuit, or the like.

A method for dividing a plurality of converter cells in an arm into two cell groups is known in the MMC converter. For example, in Japanese Patent No. 6509352 (PTL 1), an AC-DC conversion operation is performed by one cell group, and a circulating current is controlled by the other cell group.

CITATION LIST

Patent Literature

PTL 1: Japanese Patent No. 6509352

SUMMARY OF INVENTION

Technical Problem

However, in the method in which the other cell group controls only the circulating current as in PTL 1, when both active power and reactive power output from the power conversion device are small, the voltage at the capacitor included in the other cell group cannot be maintained, and there is a possibility that converter control fails. Accordingly, the voltage at the capacitor included in one cell group and the voltage at the capacitor included in the other cell group are required to be appropriately controlled.

An object of one aspect of the present disclosure is to provide a power conversion device capable of appropriately controlling the voltage at the capacitor included in each cell group even when one cell group and the other cell group perform different operations.

Solution to Problem

According to an embodiment, a power conversion device that performs power conversion between a DC circuit and an AC circuit is provided. A power conversion device includes a power conversion circuit unit including a plurality of leg circuits corresponding to a plurality of phases of an AC circuit. Each of the leg circuits includes a plurality of first converter cells each having a capacitor and connected in series to each other and a plurality of second converter cells each having a capacitor and connected in series to each other. The power conversion device further includes a control device that controls operations of a plurality of first converter cells and a plurality of second converter cells. The plurality of first converter cells are controlled not based on the circulating current circulating between the plurality of leg circuits, and the plurality of second converter cells are controlled based on the circulating current. When a voltage at the capacitor in the second converter cell is less than a first threshold, the control device controls at least one second converter cell in the plurality of second converter cells in a first mode or a second mode. The first mode is a mode for stopping a switching operation of the converter cell. The second mode is a mode in which the converter cell is caused to perform the switching operation such that a change in an output voltage of the converter cell in the second mode becomes identical to a change in the output voltage of the converter cell in the first mode.

Advantageous Effects of Invention

According to the present disclosure, even when one cell group and the other cell group perform different operations, the voltage at the capacitor included in each cell group can be appropriately controlled.

DESCRIPTION OF EMBODIMENTS

Figure 1:
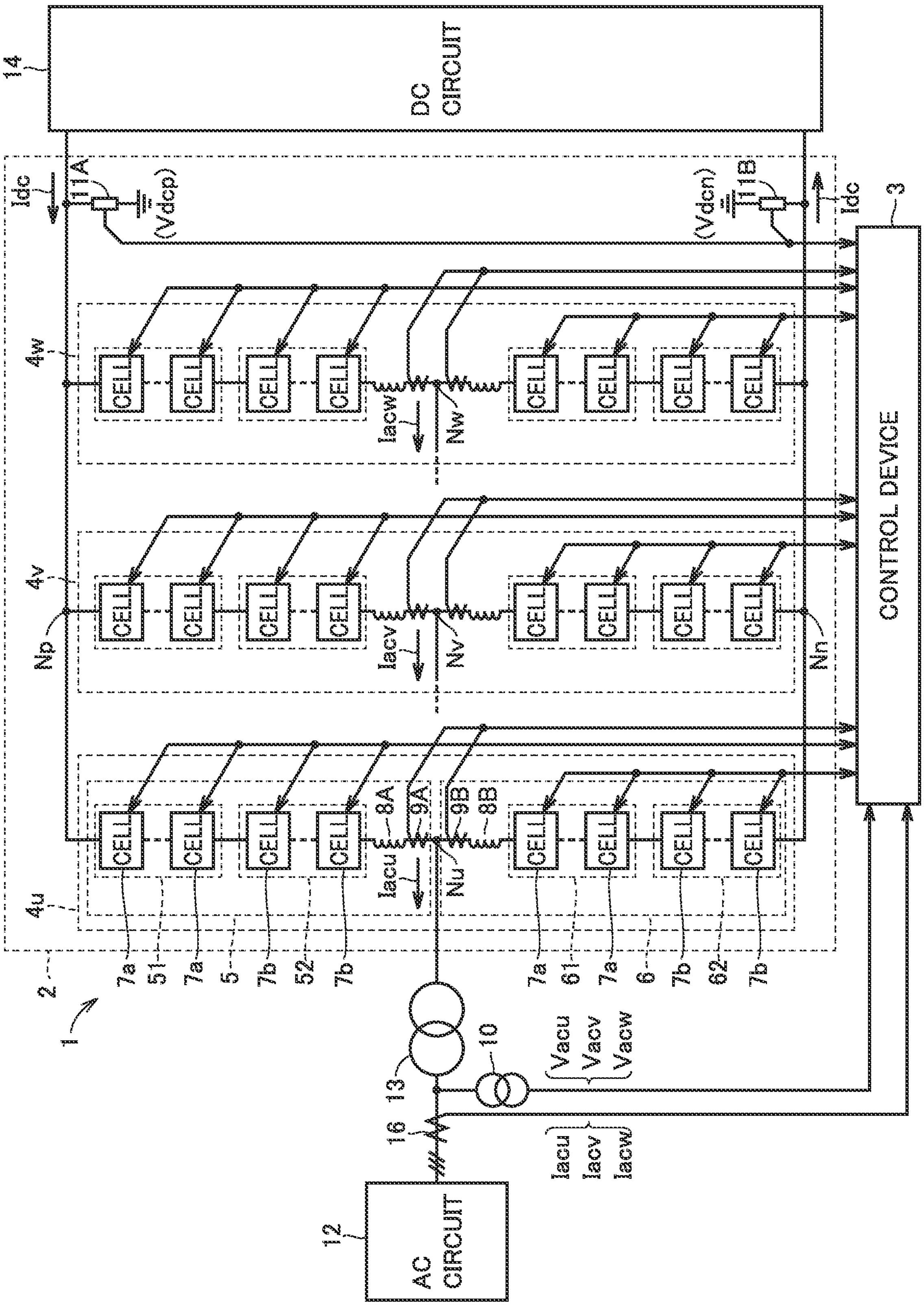
FIG. 1 is a schematic configuration diagram illustrating a power conversion device.

With reference to the drawings, embodiments of the present disclosure will be described below. In the following description, the same component is denoted by the same reference numeral. Those names and functions are the same. Thus, the detailed description thereof will not be repeated.

First Embodiment

<Schematic Configuration of Power Conversion Device>

FIG. 1 is a schematic configuration diagram illustrating a power conversion device. With reference to FIG. 1, a power conversion device 1 is configured of a modular multilevel converter including a plurality of converter cells (corresponding to "cell" in FIG. 1) connected in series to each other. Power conversion device 1 performs power conversion between a DC circuit 14 and an AC circuit 12. Power conversion device 1 includes a power conversion circuit unit 2 and a control device 3.

Power conversion circuit unit 2 includes a plurality of leg circuits 4$u$, 4$v$, 4$w$ (hereinafter, also collectively referred to as "leg circuits 4") connected in parallel to each other between a positive-side DC terminal (that is, a high-potential-side DC terminal) Np and a negative-side DC terminal (that is, a low-potential-side DC terminal) Nn.

Leg circuit 4 is provided in each of a plurality of phases constituting an alternating current. Leg circuit 4 is connected between AC circuit 12 and DC circuit 14, and performs the power conversion between both the circuits. FIG. 1 illustrates a case where AC circuit 12 is a three-phase AC system, and three leg circuits 4*u*, 4*v*, 4*w* are provided corresponding to a U-phase, a V-phase, and a W-phase, respectively.

AC terminals Nu, Nv, Nw provided in leg circuits 4*u*, 4*v*, 4*w* are connected to AC circuit 12 through a transformer 13. For example, AC circuit 12 is an AC power system including an AC power supply and the like. In FIG. 1, connection between AC terminals Nv, Nw and transformer 13 is not illustrated for ease of illustration.

A positive-side DC terminal Np and a negative-side DC terminal Nn that are commonly connected to each leg circuit 4 are connected to DC circuit 14. For example, DC circuit 14 is a DC terminal of a DC power system including a DC power supply network or the like or another power conversion device. In the latter case, a back to back (BTB) system connecting AC power systems having different rated frequencies or the like is configured by coupling two power conversion devices.

Instead of use of transformer 13 in FIG. 1, power conversion device 1 may be connected to AC circuit 12 through an interconnection reactor. A primary winding may be provided in each of leg circuits 4*u*, 4*v*, 4*w* instead of AC terminals Nu, Nv, Nw, and leg circuits 4*u*, 4*v*, 4*w* may be connected to transformer 13 or the interconnection reactor in terms of AC through a secondary winding magnetically coupled to the primary winding. In this case, the primary winding may be set to following reactors 8A, 8B. That is, leg circuit 4 is electrically (that is, in terms of DC or AC) connected to AC circuit 12 through a connection portion provided in each of leg circuits 4*u*, 4*v*, 4*w*, such as AC terminals Nu, Nv, Nw or the primary winding.

Leg circuit 4*u* includes two arms connected in series. Specifically, leg circuit 4*u* includes a positive-side arm 5 from positive-side DC terminal Np to AC terminal Nu and a negative-side arm 6 from negative-side DC terminal Nn to AC terminal Nu. The positive-side arm is also referred to as an upper arm, and the negative-side arm is also referred to as a lower arm. AC terminal Nu that is a connection point between positive-side arm 5 and negative-side arm 6 is connected to transformer 13. Positive-side DC terminal Np and negative-side DC terminal Nn are connected to DC circuit 14. Hereinafter, leg circuit 4*u* will be described below as a representative because leg circuits 4*v*, 4*w* have the same configuration.

Positive-side arm 5 includes a cell group 51 in which a plurality of converter cells 7*a* are cascade-connected, a cell group 52 in which a plurality of converter cells 7*b* are cascade-connected, and reactor 8A. Cell group 51, cell group 52, and reactor 8A are connected in series to each other. Negative-side arm 6 includes a cell group 61 in which the plurality of converter cells 7*a* are cascade-connected, a cell group 62 in which the plurality of converter cells 7*b* are cascade-connected, and reactor 8B. Cell group 61, cell group 62, and reactor 8B are connected in series to each other.

In the following description, the number of converter cells 7*a* included in each of cell group 51 and cell group 61 is set to N1. Where, N1≥2. The number of converter cells 7*b* included in each of cell group 52 and cell group 62 is set to N2. Where, N2≥1. In the following description, sometimes converter cells 7*a* and 7*b* are collectively referred to as a converter cell 7. For ease of illustration, the plurality of converter cells 7*a* are disposed adjacent to each other and the plurality of converter cells 7*b* are disposed adjacent to each other in each arm, but limitation to the configuration is not intended. The plurality of converter cells 7*a* may be disposed in a dispersed manner, and the plurality of converter cells 7*b* may be disposed in a dispersed manner. Each of the plurality of converter cells 7 included in each leg circuit 4 is converter cell 7*a* or converter cell 7*b*.

A position where reactor 8A is inserted may be any position of positive-side arm 5 of leg circuit 4*u*, and a position where reactor 8B is inserted may be any position of negative-side arm 6 of leg circuit 4*u*. A plurality of reactors 8A and a plurality of reactors 8B may be provided. Inductance values of the reactors may be different from each other. Only reactor 8A of positive-side arm 5 or only reactor 8B of negative-side arm 6 may be provided.

Although details will be described later, cell groups 51, 61 and the cell groups 52, 62 have different roles. Specifically, converter cell 7*a* of cell groups 51, 61 is not used for controlling the circulating current, but is in charge of controlling (that is, AC-DC conversion control) an AC electric quantity and a DC electric quantity, and converter cell 7*b* of cell groups 52, 62 is in charge of controlling the circulating current.

Power conversion device 1 includes an AC voltage detector 10, an AC current detector 16, DC voltage detectors 11A, 11B, and arm current detectors 9A, 9B provided in each leg circuit 4 as detectors that measure an electric quantity of (for example, current and voltage) used for control. Signals detected by these detectors are input to control device 3.

In FIG. 1, for ease of illustration, a signal line of the signal input from each detector to control device 3 and a signal line of the signal input and output between control device 3 and each converter cell 7 are partially collectively illustrated, but are actually provided for each detector and each converter cell 7. The signal line between each converter cell 7 and control device 3 may be provided separately for transmission and for reception. For example, the signal line is formed of an optical fiber.

AC voltage detector 10 detects a U-phase AC voltage Vacu, a V-phase AC voltage Vacv, and a W-phase AC voltage Vacw of AC circuit 12. AC current detector 16 detects a U-phase AC current Iacu, a V-phase AC current Iacv, and a W-phase AC current Iacw of AC circuit 12. DC voltage detector 11A detects a DC voltage Vdcp of positive-side DC terminal Np connected to DC circuit 14. DC voltage detector 11B detects a DC voltage Vdcn of negative-side DC terminal Nn connected to DC circuit 14.

Arm current detectors 9A, 9B provided in U-phase leg circuit 4*u* detect a positive-side arm current Ipu flowing through positive-side arm 5 and a negative-side arm current Inu flowing through negative-side arm 6. Arm current detectors 9A, 9B provided in V-phase leg circuit 4*v* detect a positive-side arm current Ipv and a negative-side arm current Inv. Arm current detectors 9A, 9B provided in W-phase leg circuit 4*w* detect a positive-side arm current Ipw and a negative-side arm current Inw. In the following description, positive-side arm currents Ipu, Ipv, Ipw are collectively referred to as a positive-side arm current Iarmp, negative-side arm currents Inu, Inv, Inw are collectively referred to as a negative-side arm current Iarmn, and positive-side arm current Iarmp and negative-side arm current Iarmn are collectively referred to as an arm current Iarm. In arm current Iarm, a current flowing from positive-side DC terminal Np toward negative-side DC terminal Nn is set to positive.

Control device 3 may be configured of a dedicated circuit, and a part or all of the dedicated circuit may be configured of a field programmable gate array (FPGA), a microprocessor, or the like. Typically, control device 3 includes an auxiliary transformer, an analog to digital (AD) converter, an arithmetic unit, and the like as a hardware configuration. The arithmetic unit includes a central processing unit (CPU), a random access memory (RAM), and a read only memory (ROM). The AD converter includes an analog filter, a sample hold circuit, and a multiplexer. For example, control device 3 may be configured of a digital protection control device.

<Configuration Example of Converter Cell>

Figure 2:
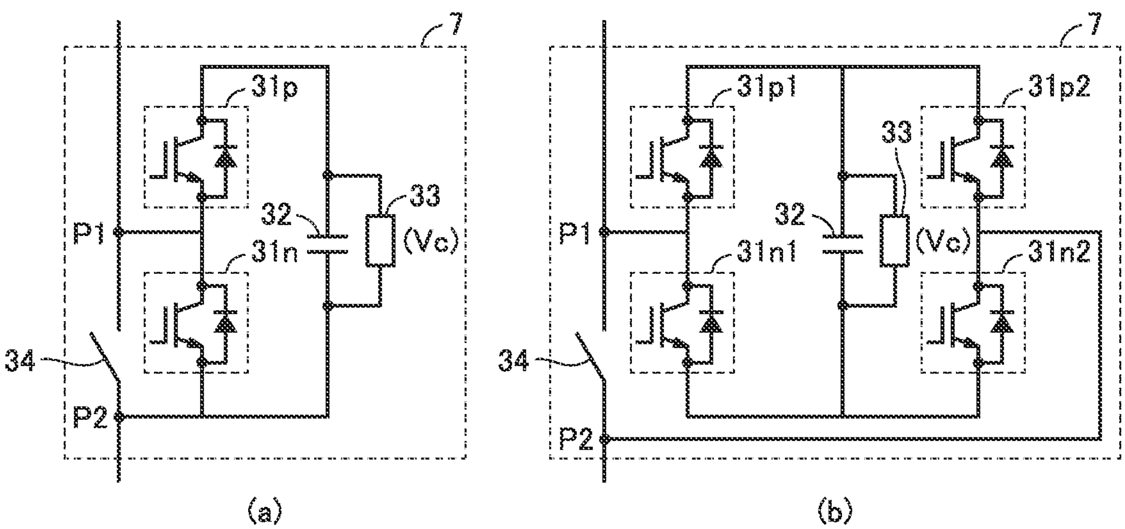
FIG. 2 is a circuit diagram illustrating an example of a converter cell constituting a cell group.

FIG. 2 is a circuit diagram illustrating an example of the converter cell constituting the cell group. Converter cell 7 in FIG. 2(*a*) has a circuit configuration called a half-bridge configuration. Converter cell 7 includes a series body formed by connecting two switching elements 31*p*, 31*n* in series, a capacitor 32 as an energy accumulator, a bypass switch 34, and a voltage detector 33. The series body and capacitor 32 are connected in parallel. Voltage detector 33 detects a capacitor voltage Vc that is the voltage at both ends of capacitor 32.

Converter cell 7 in FIG. 2(*b*) has a circuit configuration called a full-bridge configuration. Converter cell 7 includes a first series body formed by connecting two switching elements 31*p*1, 31*n*1 in series, a second series body formed by connecting two switching elements 31*p*2, 31*n*2 in series, capacitor 32, bypass switch 34, and voltage detector 33. The first series body, the second series body, and capacitor 32 are connected in parallel. Voltage detector 33 detects capacitor voltage Vc.

Two switching elements 31*p*, 31*n* in FIG. 2(*a*) and four switching elements 31*p*1, 31*n*1, 31*p*2, 31*n*2 in FIG. 2(*b*) are configured such that a freewheeling diode (FWD) is connected in antiparallel to a self-arc-extinguishing semiconductor switching element such as an insulated gate bipolar transistor (IGBT), a gate commutated turn-off (GCT) thyristor, or a metal oxide semiconductor field effect transistor (MOSFET). In FIGS. 2(*a*) and 2(*b*), a capacitor such as a film capacitor is mainly used as capacitor 32.

In the following description, switching elements 31*p*, 31*n*, 31*p*1, 31*n*1, 31*p*2, 31*n*2 are also collectively referred to as a switching element 31. In addition, on and off of the semiconductor switching element in switching element 31 will be simply referred to as "on and off of switching element 31".

With reference to FIG. 2(*a*), both terminals of switching element 31*n* are referred to as input and output terminals P1, P2. Voltage across capacitor 32 and zero voltage are output by switching operations of switching elements 31*p*, 31*n*. For example, when switching element 31*p* is turned on and when switching element 31*n* is turned off, the voltage across capacitor 32 is output. When switching element 31*p* is turned off and when switching element 31*n* is turned on, zero voltage is output. In FIG. 2(*a*), both terminals of switching element 31*n* are set as input and output terminals P1, P2, but both terminals of switching element 31*p* may be set as input and output terminals P1, P2, and in this case, the operation is reversed.

Bypass switch 34 is connected between input and output terminals P1, P2. In FIG. 2(*a*), bypass switch 34 is connected in parallel to switching element 31*n*. However, when both terminals of switching element 31*p* are input and output terminals P1, P2, bypass switch 34 is connected in parallel to switching element 31*p*. Converter cell 7 is short-circuited by turning on bypass switch 34.

With reference to FIG. 2(*b*), a midpoint between switching element 31*p*1 and switching element 31*n*1 and a midpoint between switching element 31*p*2 and switching element 31*n*2 are set to input and output terminals P1, P2 of converter cell 7. Converter cell 7 in FIG. 2(*b*) outputs positive voltage or zero voltage by constantly turning on switching element 31*n*2, constantly turning off switching element 31*p*2, and alternately turning on switching elements 31*p*1, 31*n*1. In addition, converter cell 7 in FIG. 2(*b*) can output zero voltage or negative voltage by constantly turning off switching element 31*n*2, constantly turning on switching element 31*p*2, and alternately turning on switching elements 31*p*1, 31*n*1.

Bypass switch 34 is connected between input and output terminals P1, P2. Bypass switch 34 is connected in parallel to the series body of switching elements 31*n*1, 31*n*2. Converter cell 7 is short-circuited by turning on bypass switch 34.

In the following description, the case where converter cells 7*a*, 7*b* are configured as a half-bridge cell in FIG. 2(*a*) and the semiconductor switching element and the capacitor as the energy accumulation element are used will be described as an example. However, converter cells 7*a*, 7*b* may have a full-bridge configuration in FIG. (b). A converter cell other than the configuration described above, for example, a converter cell to which a circuit configuration called a clamped double cell or the like is applied may be used, and the switching element and the energy accumulation element are not limited to those described above.

<Configuration of Control Device 3>

Figure 3:
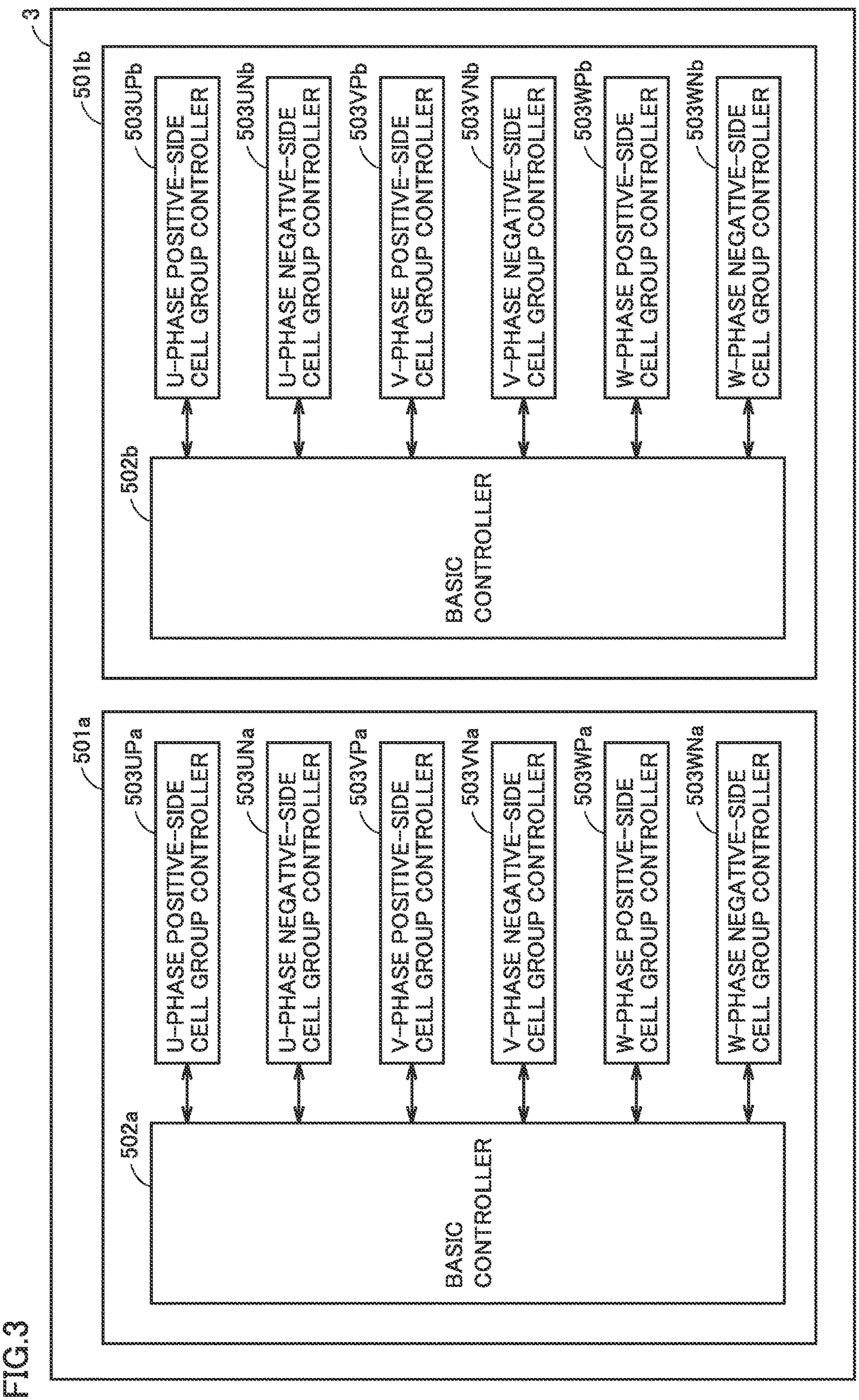
FIG. 3 is a view illustrating an internal configuration of a control device 3.

FIG. 3 is a view illustrating an internal configuration of control device 3. With reference to FIG. 3, control device 3 includes switching controllers 501*a*, 501*b* (hereinafter, also collectively referred to as a "switching controller 501"). Switching controller 501*a* controls on and off of each switching element 31 of converter cell 7*a*. Switching controller 501*b* controls on and off of each switching element 31 of converter cell 7*b*.

Switching controller 501*a* includes a basic controller 502*a*, a U-phase positive-side cell group controller 503UPa, a U-phase negative-side cell group controller 503UNa, a V-phase positive-side cell group controller 503VPa, a V-phase negative-side cell group controller 503VNa, a W-phase positive-side cell group controller 503 WPa, and a W-phase negative-side cell group controller 503 WNa. Switching controller 501*b* includes a basic controller 502*b*, a U-phase positive-side cell group controller 503UPb, a U-phase negative-side cell group controller 503UNb, a V-phase positive-side cell group controller 503VPb, a V-phase negative-side cell group controller 503VNb, a W-phase positive-side cell group controller 503WPb, and a W-phase negative-side cell group controller 503 WNb.

In the following description, U-phase positive-side cell group controller 503UPa, V-phase positive-side cell group controller 503VPa, and W-phase positive-side cell group controller 503WPa are also collectively referred to as a positive-side cell group controller 503Pa. U-phase negative-side cell group controller 503UNa, V-phase negative-side cell group controller 503VNa, and W-phase negative-side cell group controller 503 WNa are also collectively referred to as a negative-side cell group controller 503Na. Positive-side cell group controller 503Pa and negative-side cell group controller 503Na are also collectively referred to as a cell group controller 503*a*. Positive-side cell group controller 503Pa controls the operation of cell group 51, and negative-side cell group controller 503Na controls the operation of cell group 61.

U-phase positive-side cell group controller 503UPb, V-phase positive-side cell group controller 503VPb, and W-phase positive-side cell group controller 503WPb are also collectively referred to as a positive-side cell group controller 503Pb. U-phase negative-side cell group controller 503UNb, V-phase negative-side cell group controller 503VNb, and W-phase negative-side cell group controller 503WNb are also collectively referred to as a negative-side cell group controller 503Nb. Positive-side cell group controller 503Pb and negative-side cell group controller 503Nb are also collectively referred to as a cell group controller 503*b*. Positive-side cell group controller 503Pb controls the operation of cell group 52, and negative-side cell group controller 503Nb controls the operation of cell group 62.

Furthermore, basic controller 502*a* and basic controller 502*b* are also collectively referred to as a basic controller 502, and cell group controller 503*a* and cell group controller 503*b* are also collectively referred to as a cell group controller 503.

Figure 4:
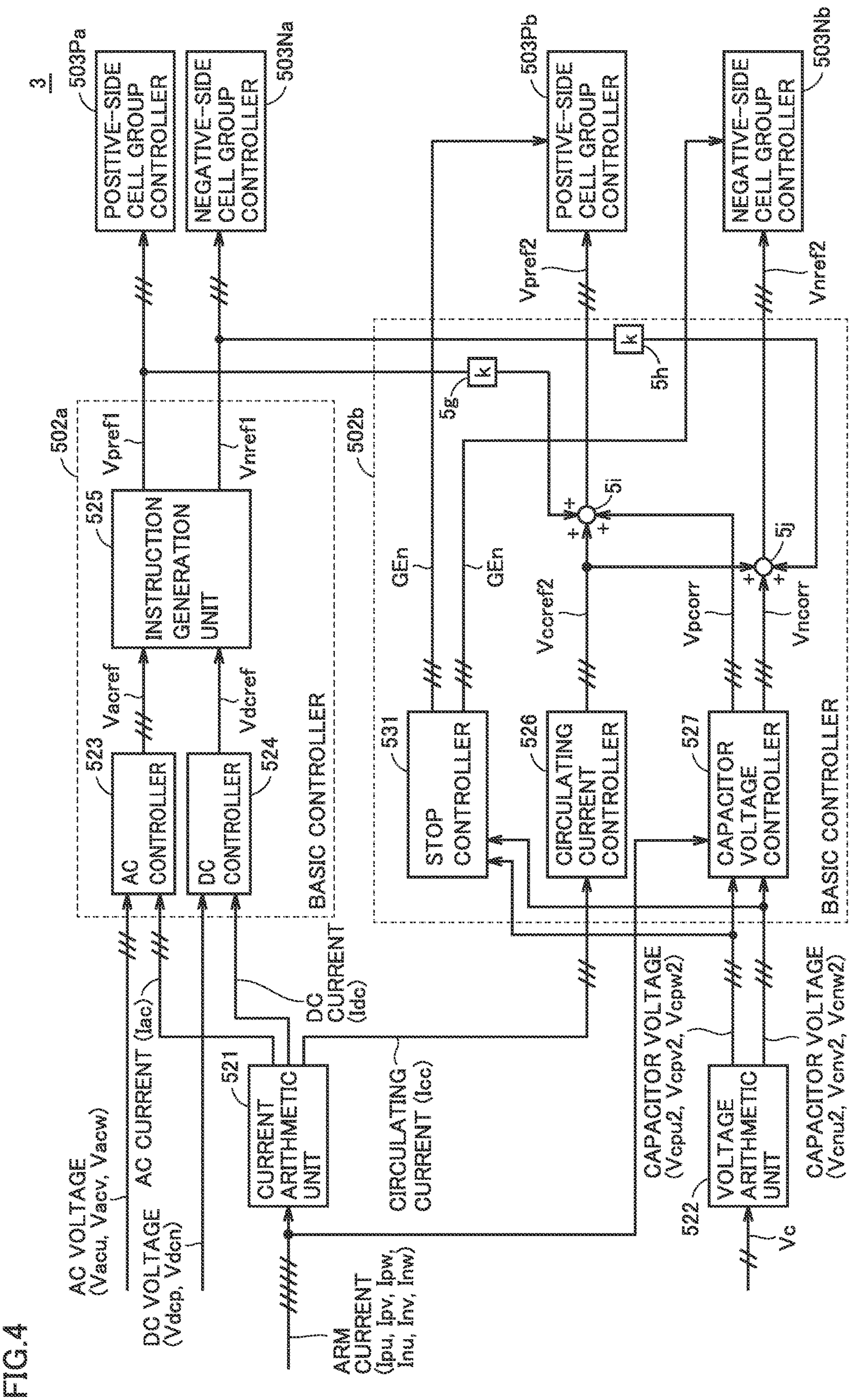
FIG. 4 is a view illustrating a configuration of a basic controller according to a first embodiment.

FIG. 4 is a view illustrating a configuration of basic controller 502 according to a first embodiment. With reference to FIG. 4, control device 3 includes basic controllers 502*a*, 502*b*, a current arithmetic unit 521, a voltage arithmetic unit 522, positive-side cell group controllers 503Pa, 503Pb, and negative-side cell group controllers 503Na, 503Nb. Basic controller 502*a* includes an AC controller 523, a DC controller 524, and an instruction generation unit 525. Basic controller 502*b* includes a circulating current controller 526, a capacitor voltage controller 527, a stop controller 531, adders 5*i*, 5*j*, and gain circuits 5*g*, 5*h*.

Basic controller 502*a* supplies voltage instruction values Vpref1, Vnref1 to positive-side cell group controller 503Pa and negative-side cell group controller 503Na, respectively. Basic controller 502*b* supplies voltage instruction values Vpref2, Vnref2 to positive-side cell group controller 503Pb and negative-side cell group controller 503Nb, respectively.

Voltage instruction values Vpref1, Vnref1 supplied to positive-side cell group controller 503Pa and negative-side cell group controller 503Na for controlling AC-DC conversion are not based on a detection value of a circulating current Icc. Voltage instruction values Vpref2, Vnref2 supplied to the positive-side cell group controller 503Pb and negative-side cell group controller 503Nb for controlling the circulating current are based on the detection value of circulating current Icc. From this, it can be said that converter cells 7*a* of cell groups 51, 61 are controlled not based on the circulating current, and converter cells 7*b* of cell groups 52, 62 are controlled based on the circulating current.

Current arithmetic unit 521 takes in the positive-side arm currents Ipu, Ipv, Ipw detected by arm current detector 9A and the negative-side arm currents Inu, Inv, Inw detected by arm current detector 9B. Current arithmetic unit 521 operates AC currents Iacu, Iacv, Iacw (hereinafter, also collectively referred to as an "AC current Iac"), a DC current Idc, and circulating currents Iccu, Iccv, Iccw (hereinafter, also collectively referred to as a "circulating current Icc") from the taken arm current. Current arithmetic unit 521 outputs each AC current Iac to AC controller 523, outputs DC current Idc to DC controller 524, and outputs circulating current Icc to circulating current controller 526.

U-phase AC current Iacu, V-phase AC current Iacv, and W-phase AC current Iacw are defined such that a current flowing from AC terminals Nu, Nv, Nw of each leg circuit 4 toward transformer 13 is set to positive. DC current Idc is defined such that a direction from DC circuit 14 toward positive-side DC terminal Np and a direction from negative-side DC terminal Nn toward DC circuit 14 are set to positive. Circulating currents Iccu, Iccv, Iccw flowing through leg circuits 4*u*, 4*v*, 4*w* are defined such that the direction from positive-side DC terminal Np toward negative-side DC terminal Nn is set to positive.

U-phase, V-phase, W-phase AC voltages Vacu, Vacv, Vacw (hereinafter, also collectively referred to as an "AC voltage Vac") detected by AC voltage detector 10 are further input to AC controller 523. AC controller 523 generates U-phase, V-phase, W-phase AC voltage instruction values Vacrefu, Vacrefv, Vacrefw (hereinafter, also collectively referred to as an "AC voltage instruction value Vacref") based on AC current Iac and AC voltage Vac.

DC voltages Vdcp, Vdcn detected by DC voltage detectors 11A, 11B are further input to DC controller 524. DC controller 524 generates a DC voltage instruction value Vdcref based on DC voltage (that is, the voltage between the DC terminals) Vdc and the DC current Idc of DC circuit 14 calculated from DC voltages Vdcp, Vdcn.

Instruction generation unit 525 generates voltage instruction values Vpref1u, Vnref1u used for U-phase cell groups 51, 61 based on U-phase AC voltage instruction value Vacrefu and DC voltage instruction value Vdcref. Instruction generation unit 525 generates voltage instruction values Vpref1v, Vnref1v used for V-phase cell groups 51, 61 based on a V-phase AC voltage instruction value Vacrefv and DC voltage instruction value Vdcref. Instruction generation unit 525 generates voltage instruction values Vpref1w, Vnref1w used for W-phase cell groups 51, 61 based on a W-phase AC voltage instruction value Vacrefw and DC voltage instruction value Vdcref.

Voltage instruction values Vpref1u, Vpref1v, Vpref1w (also collectively referred to as a "voltage instruction value Vpref1") are supplied to positive-side cell group controller 503Pa. Voltage instruction values Vnref1u, Vnref1v, Vnref1w (also collectively referred to as a "voltage instruction value Vnref1") are supplied to negative-side cell group controller 503Na.

Voltage arithmetic unit 522 receives information about capacitor voltage Vc from each converter cell 7*b* provided in cell groups 52, 62 of each leg circuit 4. Voltage arithmetic unit 522 calculates a representative value Vcp2 of the plurality of capacitor voltages of cell group 52 and calculates a representative value Vcn2 of the plurality of capacitor voltages of cell group 62 for each phase based on the information about each capacitor voltage Vc. Representative values Vcp2 of the U phase, the V phase, and the W phase are described as Vcpu2, Vcpv2, and Vcpw2, respectively, and representative values Vcn2 of the U phase, the V phase, and the W phase are described as Vcnu2, Vcnv2, and Vcnw2, respectively.

An average value, a median value, a maximum value, a minimum value, or the like of capacitor voltage Vc of each cell group can be appropriately applied for the arithmetic operation of the representative value. Voltage arithmetic unit 522 outputs representative values Vcpu2, Vcpv2, Vcpw2 of the capacitor voltages of the respective cell groups 52 and representative values Vcnu2, Vcnv2, Vcnw2 of the capacitor voltages of the respective cell groups 62 to capacitor voltage controller 527.

Capacitor voltage controller 527 receives information about each arm current Iarm, and receives information about capacitor voltages Vcpu2, Vcpv2, Vcpw2, Vcnu2, Vcnv2, Vcnw2 from voltage arithmetic unit 522.

Capacitor voltage controller 527 generates a correction value Vpcorr in order to correct voltage instruction value Vpref2 for cell group 52 based on each arm current Iarm and capacitor voltages Vcpu2, Vcpv2, Vcpw2, and outputs generated correction value Vpcorr to adder 5_i_. Capacitor voltage controller 527 generates a correction value Vncorr in order to correct a voltage instruction value Vnref2 for cell group 62 based on each arm current Iarm and capacitor voltages Vcnu2, Vcnv2, Vcnw2, and outputs generated correction value Vncorr to adder 5_j_.

Circulating current controller 526 generates circulating voltage instruction values Vccref2u, Vccref2v, Vccref2w (hereinafter, also collectively referred to as a "circulating voltage instruction value Vccref2") for controlling the circulating current of each phase based on circulating currents Iccu, Iccv, Iccw.

Adder 5_i_ adds circulating voltage instruction value Vccref2, a value obtained by multiplying voltage instruction value Vpref1 for cell group 51 by a gain k in gain circuit 5_g_, and correction value Vpcorr for each phase to generate voltage instruction value Vpref2 for cell group 52. Voltage instruction value Vpref2 is supplied to positive-side cell group controller 503Pb. Adder 5_j_ adds circulating voltage instruction value Vccref2, a value obtained by multiplying voltage instruction value Vnref1 for cell group 61 by gain k in gain circuit 5_h_, and correction value Vncorr for each phase to generate voltage instruction value Vnref2 for cell group 62. Voltage instruction value Vnref2 is supplied to negative-side cell group controller 503Nb.

Stop controller 531 generates switching permission signal GEn according to the presence or absence of a decrease in the capacitor voltage at cell groups 52, 62. When the capacitor voltages at cell groups 52, 62 decrease, stop controller 531 transmits switching permission signal GEn having a value "0" to positive-side cell group controller 503Pb and negative-side cell group controller 503Nb as a stop instruction for stopping the switching operations of cell groups 52, 62. Thus, the switching operation of each converter cell 7_b_ of cell groups 52, 62 is stopped.

On the other hand, when the capacitor voltages at cell groups 52, 62 are returned, stop controller 531 transmits switching permission signal GEn having a value "1" to positive-side cell group controller 503Pb and negative-side cell group controller 503Nb as a permission instruction permitting the switching operations of cell groups 52, 62. Thus, the switching operation of each converter cell 7_b_ of cell groups 52, 62 is restarted. As described above, in the normal state in which the capacitor voltages at cell groups 52, 62 are not lowered, the value of switching permission signal GEn is set to "1".

When switching permission signal GEn is "1", each switching element 31 of converter cell 7 can perform on and off switching operation by the gate signal. In this case, converter cell 7 is in a deblock state. When switching permission signal GEn is "0", all switching elements 31 of converter cell 7 are turned off by the gate signal. In this case, converter cell 7 is in a gate block state.

As described above, basic controller 502_a_ generates voltage instruction values Vpref1, Vnref1 in order to control the output voltages of the plurality of converter cells 7_a_ for each leg circuit 4 based on DC current Idc and DC voltage Vdc of DC circuit 14 and AC current Iac and AC voltage Vac of each phase of AC circuit 12.

Basic controller 502_b_ linearly combines circulating voltage instruction value Vccref2, voltage instruction values Vpref1, Vnref1, and correction values Vpcorr, Vncorr to generate voltage instruction values Vpref2, Vnref2 for controlling the output voltages of the plurality of converter cells 7_b_. Furthermore, basic controller 502_b_ generates the stop instruction to stop the switching operation when the capacitor voltage at converter cell 7_b_ decreases.

<Detailed Operation of Control Device 3>

(Operation of Current Arithmetic Unit)

With reference to FIG. 1, the connection point between positive-side arm 5 and negative-side arm 6 of U-phase leg circuit 4_u_ is AC terminal Nu, and AC terminal Nu is connected to transformer 13. Accordingly, AC current Iacu flowing from AC terminal Nu toward transformer 13 is a current value obtained by subtracting negative-side arm current Inu from positive-side arm current Ipu as in the following Equation (1).

$$Iacu = Ipu - Inu \tag{1}$$

Assuming that the average value of positive-side arm current Ipu and negative-side arm current Inu is a common current flowing through positive-side arm 5 and negative-side arm 6, this current is a leg current Icomu flowing through the DC terminal of leg circuit 4_u_. Leg current Icomu is expressed by the following Equation (2).

$$Icomu = (Ipu + Inu)/2 \tag{2}$$

Also in the V phase, AC current Iacv and a leg current Icomv are calculated using positive-side arm current Ipv and negative-side arm current Inv, and also in the W phase, AC current Iacw and a leg current Icomw are calculated using positive-side arm current Ipw and negative-side arm current Inw. Specifically, they are represented by the following Equations (3) to (6).

$$Iacv = Ipv - Inv \tag{3}$$

$$Icomv = (Ipv + Inv)/2 \tag{4}$$

$$Iacw = Ipw - Inw \tag{5}$$

$$Icomw = (Ipw + Inw)/2 \tag{6}$$

The positive-side DC terminals of leg circuits 4_u_, 4_v_, 4_w_ of the respective phases are commonly connected as positive-side DC terminal Np, and the negative-side DC terminals are commonly connected as negative-side DC terminal Nn. From this configuration, the current value obtained by adding leg currents Icomu, Icomv, Icomw of the respective phases becomes DC current Idc that flows in from the positive-side terminal of DC circuit 14 and feeds back to DC circuit 14 through the negative-side terminal. Accordingly, DC current Idc is expressed as the following Equation (7).

$$Idc = Icomu + Icomv + Icomw \tag{7}$$

When the DC current components included in the leg current are equally shared by the respective phases, the current capacity of the converter cell can be equalized. With this taken into consideration, the difference between the leg current and ⅓ of the DC current value can be operated as the current value of the circulating current that does not flow through DC circuit 14 but flows between the legs of each phase. Consequently, circulation currents Iccu, Iccv, Iccw of the U phase, the V phase, and the W phase are expressed as the following Equations (8), (9), (10).

$$Iccu = Icomu - Idc/3 \tag{8}$$

$$Iccv = Icomv - Idc/3 \tag{9}$$

$$Iccw = Icomw - Idc/3 \tag{10}$$

Current arithmetic unit 521 in FIG. 4 operates AC currents Iacu, Iacv, Iacw, the DC current Idc, and the circulation currents Iccu, Iccv, Iccw from positive-side arm currents Ipu, Ipv, Ipw and negative-side arm currents Inu, Inv, Inw according to the above equation.

(Operation of AC Controller 523)

From AC voltages Vacu, Vacv, Vacw detected by AC voltage detector 10 and AC currents Iacu, Iacv, Iacw output from current arithmetic unit 521, AC controller 523 outputs the AC voltages to be output from converter cells 7 constituting power conversion device 1 as AC voltage instruction values Vacrefu, Vacrefv, Vacrefw.

For example, AC controller 523 is configured of an AC current controller that performs feedback control such that the AC current value is matched with the AC current instruction value, an AC voltage controller that performs feedback control such that the AC voltage value is matched with the AC voltage instruction value, and the like according to a function required for power conversion device 1. Alternatively, AC controller 523 may be configured of a power controller that obtains power from the AC current value and the AC voltage value and performs feedback control such that the power value becomes a desired value. In practice, one or a plurality of the AC current controllers, the AC voltage controllers, and the power controllers are combined to configure and operate AC controller 523.

Because the AC current controller described above controls the current output to AC circuit 12 through transformer 13, the voltage component controlling the current is a positive phase component and a reversed phase component of the multi-phase AC voltage or a component known as a normal mode component. Similarly, the AC voltage controller outputs the positive phase component and the reversed phase component to AC circuit 12 through transformer 13.

When the three-phase AC voltage is output to AC circuit 12, it is also conceivable to output a voltage component common to the three phases, which are known as a zero-phase component or a common mode component, to AC circuit 12 in addition to these positive and negative phase components. For example, when a third harmonic wave having a frequency three times the fundamental wave frequency is superimposed on the zero-phase component, it is known that the fundamental wave AC component that can be output by converter cell 7 can be increased by about 15%.

Furthermore, by outputting a constant zero-phase component, the following effects can be obtained. In power conversion device 1 having the configuration in FIG. 1, the AC voltage component output from cell group 51 and the AC voltage component output from cell group 61 have opposite polarities, and the DC voltage component output from cell group 51 and the DC voltage component output from cell group 61 have the same polarity. Accordingly, when a certain zero-phase component is included in the AC voltage component, the zero-phase component is superimposed on the DC voltage component output from cell group 51 and the DC voltage component output from cell group 61 in the positive and negative opposite directions. As a result, because the difference is generated between the DC power output from cell group 51 and the DC power output from cell group 61, the energy accumulated in capacitor 32 included in each converter cell 7 can be exchanged between cell group 51 and cell group 61. Thus, the voltage value of capacitor 32 of each converter cell 7 constituting cell group 51 and the voltage value of capacitor 32 of converter cell 7 constituting cell group 61 can be balanced, and the zero-phase voltage can be used for such balance control.

(Operation of DC Controller 524)

DC controller 524 operates a DC inter-terminal voltage Vdc from the difference voltage between DC voltages Vdcp, Vdcn detected by DC voltage detectors 11A, 11B, and is expressed as the following Equation (11).

$$Vdc = Vdcp - Vdcn \quad (11)$$

DC controller 524 generates and outputs the DC voltage that should be output by converter cell 7 as DC voltage instruction value Vdcref from DC inter-terminal voltage Vdc and DC current Idc.

For example, DC controller 524 is configured by combining any one or a plurality of the DC current controllers that control the DC current, the DC voltage controllers that control the DC voltage, and the DC power controllers that control the DC power. The DC voltage component output from cell group 51 and the DC voltage component output from cell group 61 have the same polarity according to DC voltage instruction value Vdcref output from the DC voltage controller, the DC current controller, and the DC power controller. Because cell groups 51, 61 are connected in series, the output voltages of cell groups 51, 61 are combined, and the combined voltage becomes a voltage component generated between the positive-side DC terminal and the negative-side DC terminal of leg circuit 4. DC voltage instruction value Vdcref is given to positive-side cell group controller 503Pa and negative-side cell group controller 503Na as components common to the respective phases. Consequently, according to DC voltage instruction value Vdcref, the voltage components output from cell groups 51, 61 become DC voltage components output to DC circuit 14.

(Operation of Instruction Generation Unit 525)

Instruction generation unit 525 operates the voltage to be output from cell group 51 as voltage instruction value Vpref1, and operates the voltage to be output from cell group 61 as voltage instruction value Vnref1. Each of voltage instruction values Vpref1, Vnref1 is obtained by combining DC voltage instruction value Vdcref and AC voltage instruction value Vacref for each phase.

Specifically, cell group 51 and cell group 61 are connected in series between positive-side DC terminal Np and negative-side DC terminal Nn that are connected to DC circuit 14. Accordingly, when each of voltage instruction value Vpref1 of cell group 51 and voltage instruction value Vnref1 of cell group 61 is calculated, ½ of DC voltage instruction value Vdcref is added and combined. On the other hand, because each of AC terminals Nu, Nv, Nw are located at the connection point between positive-side arm 5 and the negative-side arm 6, AC voltage instruction value Vacref is subtracted and combined when voltage instruction value Vpref1 of cell group 51 is calculated, and AC voltage instruction value Vacref is added and combined when voltage instruction value Vnref1 of cell group 61 is calculated. Specifically, voltage instruction values Vpref1u, Vpref1v, Vpref1w, Vnref1u, Vnref1v, Vnref1w are expressed as the following Equations (12) to (17).

$$Vpref1u = Vdcref/2 - Vacrefu \quad (12)$$

$$Vpref1v = Vdcref/2 - Vacrefv \quad (13)$$

$$Vpref1w = Vdcref/2 - Vacrefw \quad (14)$$

$$Vnref1u = Vdcref/2 + Vacrefu \quad (15)$$

$$Vpref1v = Vdcref/2 + Vacrefv \quad (16)$$

$$Vnref1w = Vdcref/2 + Vacrefw \quad (17)$$

Further, a zero-phase potential Vn is expressed by the following Equation (18).

$$Vn = Vacrefu + Vacrefv + Vacrefw \quad (18)$$

For example, in leg circuit 4u of FIG. 1, when cell group 51 outputs the AC voltage having a relatively small value and when cell group 61 outputs the AC voltage having a relatively large value, the potential of AC terminal Nu approaches the potential of positive DC terminal Np, and a high voltage is output to AC terminal Nu. Specifically, cell group 61 outputs the AC voltage having the same polarity as the AC voltage to be output from AC terminal Nu, and cell group 51 outputs the AC voltage having the opposite polarity to the AC voltage to be output from AC terminal Nu.

(Operation of Circulating Current Controller 526)

U-phase, V-phase, W-phase circulating currents Iccu, Iccv, Iccw operated by current arithmetic unit 521 are sent to circulating current controller 526. Circulating current controller 526 performs feedback control such that the circulating current value is matched with the circulating current instruction value. That is, a compensator that amplifies a deviation between the circulating current instruction value and the circulating current value is provided in circulating current controller 526. At this point, a zero current is usually given as the circulating current instruction value, but a non-zero value may be given when imbalance is generated in the power system. Circulating current controller 526 outputs voltage components to be output by cell groups 52, 62 for the circulating current control as circulating voltage instruction value Vccref2.

Specifically, circulating current controller 526 generates circulating voltage instruction value Vccref2u for the U-phase that compensates for (that is, the deviation is set to zero) the deviation between circulating current Iccu and circulating current instruction value Iccrefu. Similarly, circulating current controller 526 generates circulating voltage instruction value Vccref2v for the V-phase that compensates for the deviation between circulating current Iccv and circulating current instruction value Iccrefv, and generates circulating voltage instruction value Vccref2w for the W-phase that compensates for the deviation between circulating current Iccw and circulating current instruction value Iccrefw. Circulating voltage instruction values Vccref2u, Vccref2u, Vccref2w are also collectively referred to as a circulating voltage instruction value Vccref2.

The circulating current is a current flowing between legs of different phases. Cell groups 51, 61 and reactors 8A, 8B exist in a current path of the circulating current, and the circulating current is generated by applying the potential difference generated by switching of cell groups 51, 61 to reactors 8A, 8B. Accordingly, when voltages of opposite polarities are applied to the reactor by cell groups 52, 62 provided in the same path, the circulating current is prevented.

For example, in the case where circulating current Iccu flows from the positive-side DC terminal to the negative-side DC terminal of leg circuit 4*u*, the voltage in the direction in which the circulating current is decreased is applied to the reactors 8A, 8B when the positive voltage is output in each of cell groups 52, 62 of leg circuit 4*u*. When the current flows in the reverse direction of the above, the circulating current is attenuated when the voltages at cell groups 52, 62 are also applied in the reverse direction. Circulating current controller 526 executes feedback control such that the circulating current instruction value and the circulating current value are matched with each other.

(Operation of Capacitor Voltage Controller 527)

The voltage at capacitor 32 of each converter cell 7*b* constituting each of cell groups 52, 62 is detected by voltage detector 33. Voltage arithmetic unit 522 operates capacitor voltages Vcpu2, Vcpv2, Vcpw2 of converter cells 7*b* of cell group 52 and capacitor voltages Vcnu2, Vcnv2, Vcnw2 (simply referred to as "capacitor voltage") of converter cells 7*b* of cell group 62.

The compensator provided in capacitor voltage controller 527 performs control operation such that the capacitor voltages at cell groups 52, 62 of the respective phases follow the capacitor voltage instruction value. Capacitor voltage controller 527 outputs a result obtained by multiplying the control arithmetic result by the polarity (for example, 1 or −1) of arm current Iarm to adders 5*i*, 5*j* as the correction value for the circulating current control.

Specifically, capacitor voltage controller 527 performs the control operation such that capacitor voltages Vcpu2, Vcpv2, Vcpw2 follow the capacitor voltage instruction value, and multiplies the control arithmetic result by the polarities of the positive arm currents Ipu, Ipv, Ipw to generate correction values Vpcorru, Vpcorrv, Vpcorrw (hereinafter, also collectively referred to as a "correction value Vpcorr") for the U-phase, the V-phase, and the W-phase. In addition, capacitor voltage controller 527 performs the control operation such that capacitor voltages Vcnu2, Vcnv2, Vcnw2 follow the capacitor voltage instruction value, and multiplies the control arithmetic result by the polarities of negative arm currents Inu, Inv, Inw to generate correction values Vncorru, Vncorrv, Vncorrw (hereinafter, also collectively referred to as a "correction values Vncorr") for the U-phase, the V-phase, and the W-phase.

(Operation of Adders 5*i*, 5*j*)

Adder 5*i* adds circulating voltage instruction value Vccref2, a value proportional to voltage instruction value Vpref1 for cell group 51, and correction value Vpcorr for each phase. The addition result of adder 5*i* is input to positive-side cell group controller 503Pb as a voltage instruction value Vpref2 (for U-phase: Vpref2u, for V-phase: Vpref2v, for W-phase: Vpref2w) representing the voltage component to be output from cell group 52. Adder 5*j* adds circulating voltage instruction value Vccref2, a value proportional to voltage instruction value Vnref1 for cell group 61, and correction value Vncorr for each phase. The addition result of adder 5*j* is input to negative-side cell group controller 503Nb as a voltage instruction value Vnref2 (for U phase: Vnref2u, for V phase: Vnref2v, for W phase: Vnref2w) representing the voltage component to be output from cell group 62.

The reason why the proportional values of the voltage instruction values are added in adders 5*i*, 5*j* is that the half bridge type in FIG. 2(*a*) is used for converter cells 7*b* constituting cell groups 52, 62 for the circulating current control. Because the half-bridge type converter cell can output only the zero voltage or the positive voltage, in order to increase or decrease the output voltage of converter cell 7 according to the increase or decrease in the circulating current, the output voltage is required to increase or decrease based on a certain voltage value. However, when the voltage serving as the reference is fixed to a constant value, undesirably capacitor 32 continues to be charged by DC current Idc flowing between DC circuit 14 and leg circuit 4. In order to avoid this problem, k times of voltage instruction values Vpref1, Vnref1n for cell groups 51, 61 are added to voltage instruction values Vpref2, Vnref2 for cell groups 52, 62 as the reference voltages.

Thus, under the current conditions corresponding to the voltage instruction values Vpref1, Vnref1, the deviation between the AC power and the DC power generated in converter cells 7*b* constituting cell groups 52, 62 can be reduced (that is, the active power flowing into or out of converter cell 7*b* approaches zero), so that the voltage fluctuation of capacitors 32 of converter cells 7*b* can be prevented. Gain k is set to an arbitrary value such that the output voltage of converter cell 7*b* is not saturated when circulating voltage instruction value Vccref2 for the circulating current control is given.

When converter cell 7*b* of cell groups 52, 62 for the circulating current control is configured of converter cell 7 having the full-bridge configuration in FIG. 2(*b*), converter cell 7*b* can output the voltage at both poles, so that gain k can also be set to zero.

Furthermore, the reason why the correction value is added in adders 5*i*, 5*j* will be described. Because the voltages output from cell groups 52, 62 for the circulating current control have a function of controlling the currents flowing through reactors 8A, 8B, the output power of cell groups 52, 62 becomes substantially reactive power. However, when the active power due to the loss exists in reactors 8A, 8B cannot be ignored, the active power is required to be supplied to cell groups 52, 62. This is because the voltages at capacitors 32 of cell groups 52, 62 cannot be maintained only by providing proportional values of voltage instruction values Vpref1, Vnref1 to the cell groups 52, 62.

According to the above configuration, (i) when arm current Iarm is positive (polarity=1) and when the capacitor voltage is smaller than the instruction value, the compensator outputs the positive signal. Accordingly, by multiplying the output of the compensator by the polarity (=1) of arm current Iarm, the correction value for the circulating current control becomes the signal having the positive component. The signal of the correction value lengthens the period during which switching element 31*p* is conductive, so that the period during which arm current Iarm flows into capacitor 32 increases. As a result, the deviation between the capacitor voltage instruction value and the detection value of the capacitor voltage is eliminated because capacitor 32 is charged.

(ii) When arm current Iarm is positive (polarity=1) and when the capacitor voltage is larger than the instruction value, the compensator outputs the negative signal. Accordingly, by multiplying the output of the compensator by the polarity (=1) of arm current Iarm, the correction value for the circulating current control becomes the signal having the negative component. The signal of the correction value shortens the period during which switching element 31*p* is conductive, so that the deviation between the capacitor voltage instruction value and the detection value of the capacitor voltage is eliminated.

(iii) When arm current Iarm is negative (polarity=−1) and when the capacitor voltage is smaller than the instruction value, the compensator outputs the positive signal. Accordingly, by multiplying the output of the compensator by the polarity (=−1) of arm current Iarm, the correction value for the circulating current control becomes the signal having the negative component. The signal of the correction value shortens the period during which switching element 31*p* is conductive, so that the period during which arm current Iarm flows out of capacitor 32 decreases. As a result, the deviation between the capacitor voltage instruction value and the detection value of the capacitor voltage is eliminated because the discharge time of capacitor 32 decreases.

(iv) When arm current Iarm is negative (polarity=−1) and when the capacitor voltage is larger than the instruction value, the compensator outputs the negative signal. Accordingly, by multiplying the output of the compensator by the polarity (=−1) of arm current Iarm, the correction value for the circulating current control becomes the signal having the positive component. The discharge time of capacitor 32 increases because the signal of the correction value lengthens the period during which switching element 31*p* is conductive, so that the deviation between the capacitor voltage instruction value and the detection value of the capacitor voltage is eliminated.

(Operation of Stop Controller 531)

In the above description, the capacitor voltage is maintained by the correction value output from capacitor voltage controller 527. However, when the magnitude of arm current Iarm is small and when the active power and the reactive power output from power conversion device 1 are small, converter cells 7*b* of cell groups 52, 62 that do not perform the AC-DC conversion control cannot sufficiently charge capacitor 32 even with the correction value by capacitor voltage controller 527. In this case, the voltage at capacitor 32 of converter cell 7*b* cannot be maintained but decreases.

Accordingly, when the voltage at capacitor 32 of converter cell 7*b* is less than a certain value, control device 3 stops the switching operation of converter cell 7*b*. This prevents converter cell 7*b* from discharging from capacitor 32, so that capacitor 32 can be charged.

Specifically, when converter cell 7*b* is a converter cell having a half-bridge configuration as illustrated in FIG. 2(*a*), the arm current flowing from the side of input and output terminal P1 flows to capacitor 32 through the freewheeling diode of switching element 31*p*, so that capacitor 32 is charged. On the other hand, when converter cell 7*b* is a converter cell having a full-bridge configuration as illustrated in FIG. 2(*b*), the arm current flowing from the side of input and output terminal P1 flows to capacitor 32 through the freewheeling diode of switching element 31*p*1. The arm current flowing from the side of input and output terminal P2 flows to capacitor 32 through the freewheeling diode of switching element 31*p*2. Accordingly, capacitor 32 is charged even when the arm current flows in from any direction.

As described above, when the switching operation of converter cell 7*b* is stopped to prevent capacitor 32 from being discharged, so that capacitor 32 can be charged by the arm current flowing in power conversion circuit unit 2. A specific operation of stop controller 531 will be described below.

Stop controller 531 receives capacitor voltages Vcpu2, Vcpv2, Vcpw2 at cell group 52 of each phase and capacitor voltages Vcnu2, Vcnv2, Vcnw2 at cell group 62 of each phase. Then, stop controller 531 determines whether at least one of capacitor voltages Vcpu2, Vcpv2, Vcpw2, Vcnu2, Vcnv2, Vcnw2 is less than a threshold Th1. For example, threshold Th1 is set to about 90% of the rated value of the capacitor voltage.

When at least one capacitor voltage is less than threshold Th1, stop controller 531 determines that the capacitor voltage decreases, and outputs switching enabling signal GEn having the value "0" to positive-side cell group controller 503Pb and negative-side cell group controller 503Nb as the stop instruction for stopping the switching operations of all converter cells 7*b* of cell groups 52, 62.

Subsequently, when the capacitor voltage at converter cell 7*b* is returned, stop controller 531 outputs an instruction to restart the switching operation of converter cell 7*b*. Specifically, when all the capacitor voltages (that is, each of capacitor voltages Vcpu2, Vcpv2, Vcpw2, Vcnu2, Vcnv2, Vcnw2) become equal to or larger than a threshold Th2, stop controller 531 outputs switching enabling signal GEn having the value "1" to positive-side cell group controller 503Pb and negative-side cell group controller 503Nb as the instruction to restart the switching operations of all converter cells 7*b* in cell groups 52, 62. Thus, the control switching converter cells 7*b* of cell groups 52, 62 based on the circulating current is restarted. In order to prevent chattering and the like, threshold Th2 is set to be larger than threshold Th1 and to be close to the rated value of the capacitor voltage (for example, 99% of the rated value).

Although the configuration in which stop controller 531 stops the switching operations of all converter cells 7*b* of cell groups 52, 62 has been described above, the configuration in which the switching operation of converter cells 7*b* is individually stopped may be used.

Stop controller 531 receives information about capacitor voltage Vc from each converter cell 7*b* provided in cell groups 52, 62 of each leg circuit 4. Subsequently, when determining that the capacitor voltage of at least one converter cell 7*b* in converter cells 7*b* becomes less than threshold Th1, stop controller 531 outputs the stop instruction to stop the switching operation of the at least one converter cell 7*b* in which the capacitor voltage decreases. When the plurality of converter cells 7*b* become a stop target, stop controller 531 outputs the stop instruction to simultaneously stop the switching operations of the plurality of converter cells 7*b*. Alternatively, the switching operations of the plurality of converter cells 7*b* may be stopped in order. For example, stop controller 531 outputs the stop instruction to stop the switching operation sequentially from converter cell 7*b* having the smaller capacitor voltage in the plurality of converter cells 7*b*.

(Configuration and Operation of Cell Group Controller 503)

Figure 5:
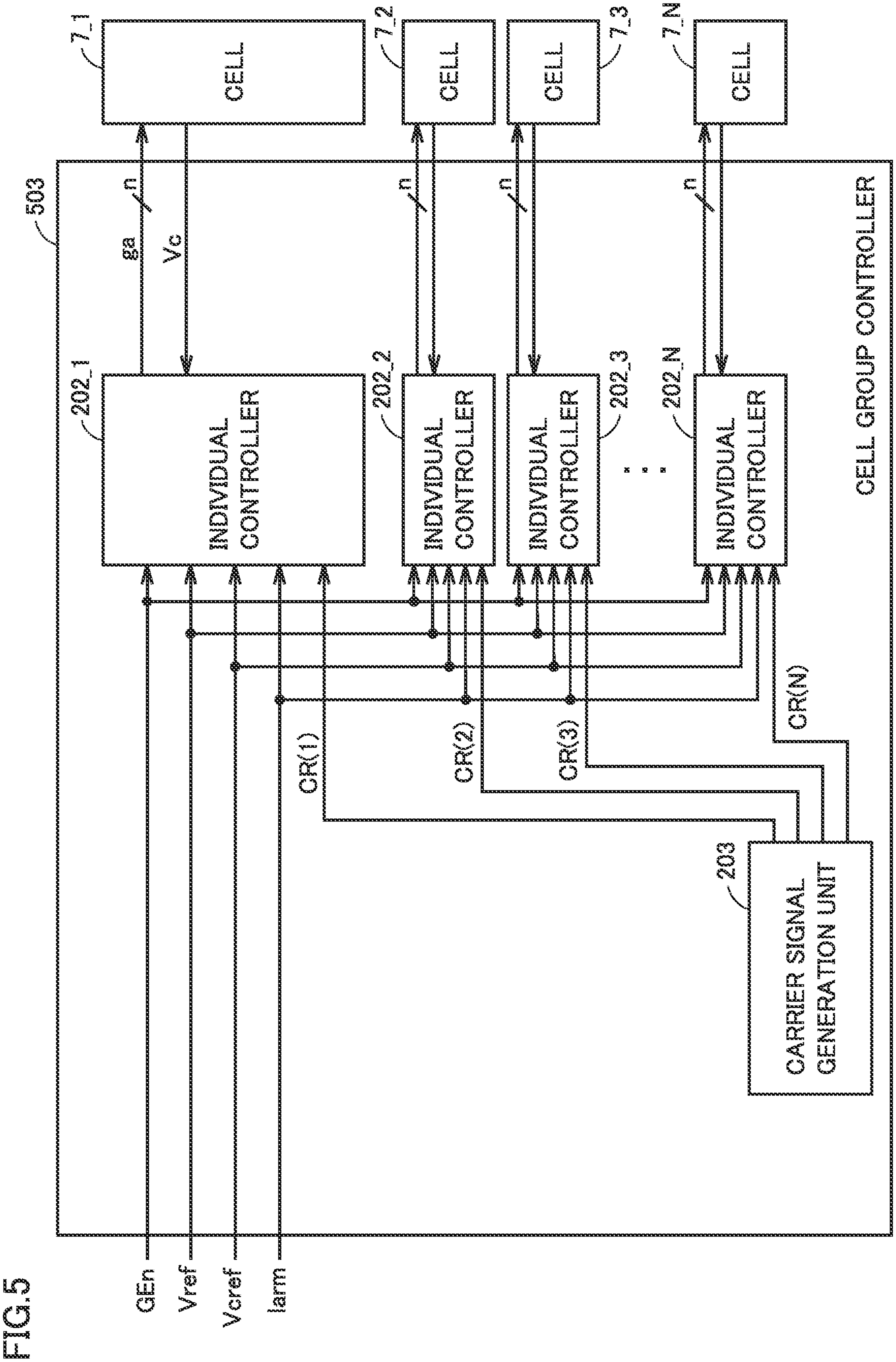
FIG. 5 is a view illustrating a configuration of a cell group controller.

FIG. 5 is a view illustrating a configuration of cell group controller 503. With reference to FIG. 5, cell group controller 503 includes N individual controllers 202_1 to 202_N (hereinafter, also collectively referred to as an "individual controllers 202"). For example, N1 converter cells 7*a* are included in cell groups 51, 61. Accordingly, each of positive-side cell group controller 503Pa and negative-side cell group controller 503Na corresponding to cell groups 51, 61 includes N1 individual controllers 202. Hereinafter, for the sake of description, voltage instruction values Vpref1, Vnref1, Vpref2, Vnref2 will be collectively referred to as a voltage instruction value Vref.

Individual controller 202_*i* individually controls corresponding converter cells 7. Individual controller 202_*i* receives voltage instruction value Vref, arm current Iarm, capacitor voltage instruction value Vcref, and a switching permission signal GEn from basic controller 502. Capacitor voltage instruction value Vcref is generated by basic controller 502. For example, capacitor voltage instruction value Vcref is a rated value of capacitors 32 of the plurality of converter cells 7 included in each cell group. Individual controller 202_*i* receives capacitor voltage Vc from corresponding converter cell 7_*i*. Individual controller 202_*i* transmits capacitor voltage Vc to basic controller 502.

As described above, switching permission signal GEn for cell groups 52, 62 is generated by basic controller 502*b* (more specifically, stop controller 531). Switching permission signal GEn for cell groups 51, 61 is generated by basic controller 502*a*. However, the value of switching permission signal GEn generated by basic controller 502*a* is basically set to "1" such that the switching operations of cell groups 51, 61 can be performed. For example, when an accident is generated in the power system or when a transient operation is difficult, basic controller 502*a* generates switching permission signal GEn having the value of "0" and stops the switching operations of cell groups 51, 61.

Carrier signal generation unit 203 sets a reference phase of the carrier signal for each converter cell 7, and generates the carrier signal having the set reference phase. Specifically, carrier signal generation unit 203 sets an interval between the reference phases (hereinafter, also referred to as a "carrier reference phase") of the plurality of carrier signals CR(i) to an interval obtained by dividing 360 degrees by the number N of the plurality of converter cells 7_*i*. The reference phase of carrier signal CR(i) represents a difference between the phase of carrier signal CR(i) and a reference phase. The phase of a carrier signal CR (0) can be used as the reference phase. Carrier signal generation unit 203 generates carrier signals CR (1) to CR (N) having the set carrier reference phase.

Individual controller 202_*i* receives a carrier signal CRi from carrier signal generation unit 203. Individual controller 202_*i* performs pulse width modulation (PWM) control on converter cell 7_*i* using carrier signal CRi. Specifically, when switching enabling signal GEn is "1" (that is, the converter cell 7_*i* is in the deblock state), individual controller 202_*i* modulates voltage instruction value Vref and carrier signal CRi of converter cell 7_*i* by the phase shift PWM method, thereby generating gate signal ga (for example, a PWM modulation signal) and outputting gate signal ga to converter cell 7_*i*. Individual controller 202_*i* performs modulation according to the configuration of converter cell 7_*i*. In the configuration of converter cell 7_*i*, the number n of PWM modulation signals to be output also increases or decreases. For example, n=2 for the converter cell in the half-bridge configuration, and n=4 for the converter cell in the full-bridge configuration.

Advantages

According to the first embodiment, in power conversion device 1 including the cell group for the AC-DC conversion control and the cell group for the circulating current control, the switching operation of converter cell 7*b* is stopped when the capacitor voltage at converter cell 7*b* decreases. Consequently, the capacitor of converter cell 7*b* can be charged, and the voltage at the capacitor included in each cell group can be appropriately controlled.

Second Embodiment

When the capacitor voltage is returned to restart the switching operation after the switching operation of converter cell 7*b* is stopped as in the first embodiment, there is a possibility that the AC voltage at AC circuit 12 instantaneously fluctuates due to a rapid change in the output voltage at converter cell 7*b* at the time of restart. Accordingly, a configuration in which the output voltages at cell groups 52, 62 are changed in a ramp shape when the switching operation of converter cell 7*b* is restarted will be described in a second embodiment.

Figure 6:
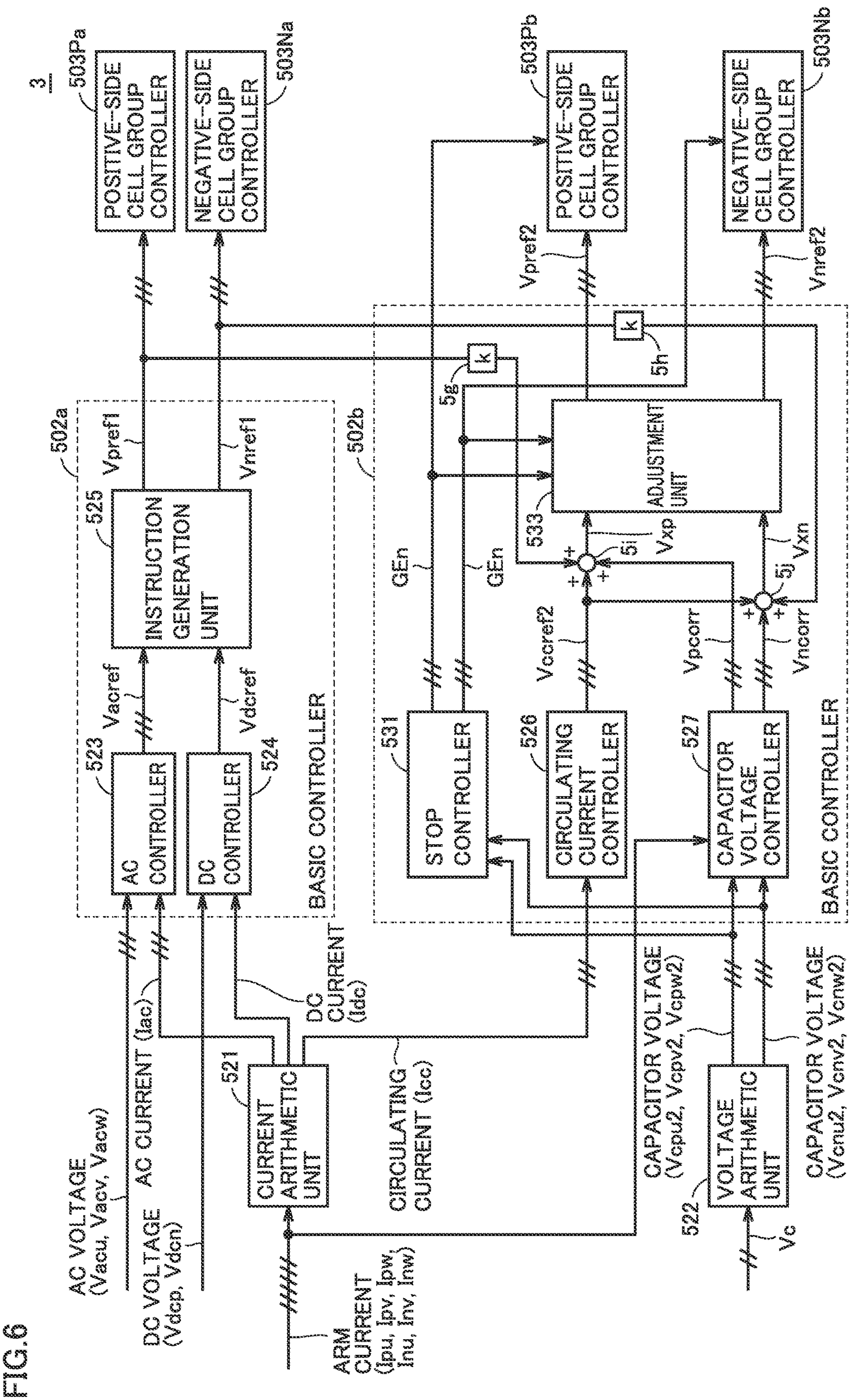
FIG. 6 is a view illustrating a configuration of a basic controller according to a second embodiment.

FIG. 6 is a view illustrating a configuration of basic controller 502 according to the second embodiment. Basic controller 502*b* in FIG. 6 corresponds to a configuration in which an adjustment unit 533 is added to basic controller 502*b* in FIG. 4. The other configurations are the same. The addition results of the U-phase, the V-phase, and the W-phase output from adder 5*i* are described as voltage values Vxpu, Vxpv, Vxpw (hereinafter, also collectively referred to as a "voltage value Vxp"). The addition results of the U-phase, the V-phase, and the W-phase output from adder 5*j* are described as voltage values Vxnu, Vxnv, Vxnw (hereinafter, also collectively referred to as a "voltage value Vxn").

When receiving the input of the instruction (that is, switching permission signal GEn "1") to restart the switching operation of converter cell 7*b*, adjustment unit 533 sets the output voltages of cell groups 52, 62 at the present time (that is, a restart time point of the switching operation) as initial values of voltage instruction values Vpref2, Vnref2 for cell groups 52, 62. Subsequently, adjustment unit 533 changes voltage instruction values Vpref2, Vnref2 from the initial values in the ramp shape. Specifically, adjustment unit 533 changes voltage instruction value Vpref2 in the ramp shape so as to finally converge from the set initial value to voltage instruction value Vxp that is the addition result of adder 5*i*. Adjustment unit 533 changes voltage instruction value Vnref2 in the ramp shape such that voltage instruction value Vnref2 finally converges to voltage instruction value Vxn that is the addition result of adder 5*j* from the set initial value.

When the switching operation of converter cell 7*b* is stopped, the output voltage at converter cell 7*b* becomes a counter voltage that prevents the flow of the arm current. Consequently, the amplitude values of the output voltages at cell groups 52, 62 at the time when the switching operation is restarted are larger than the amplitude values of the output voltages during the normal switching operation. Accordingly, adjustment unit 533 typically converges voltage instruction values Vpref2, Vnref2 to voltage instruction values Vxp, Vxn by ramping down the amplitude values of the output voltages at cell groups 52, 62 at the restart time point. After the convergence (that is, in the normal state where the capacitor voltage at converter cell 7*b* does not decrease), because the voltage adjustment is not performed by adjustment unit 533, voltage instruction values Vpref2, Vnref2 are the same as voltage instruction values Vxp, Vxn.

Advantages

According to the second embodiment, it is possible to prevent the output voltage fluctuation of power conversion device 1 can be prevented when the switching operation of converter cell 7*b* is restarted.

Third Embodiment

As described in the first embodiment, while cell groups 52, 62 are stopped, capacitor 32 of converter cell 7*b* is charged by the arm current flowing through power conversion circuit unit 2. However, when the active power and the reactive power output from power conversion device 1 are small, because the magnitude (for example, the effective value) of the arm current is also small, sometimes it takes a time to perform the charge. Accordingly, a method for shortening the charge time of capacitor 32 by increasing the effective value of the arm current (more specifically, the current flowing through converter cell 7*b*) flowing through power conversion circuit unit 2 will be described in a third embodiment.

<Increase in AC Current>

Figure 7:
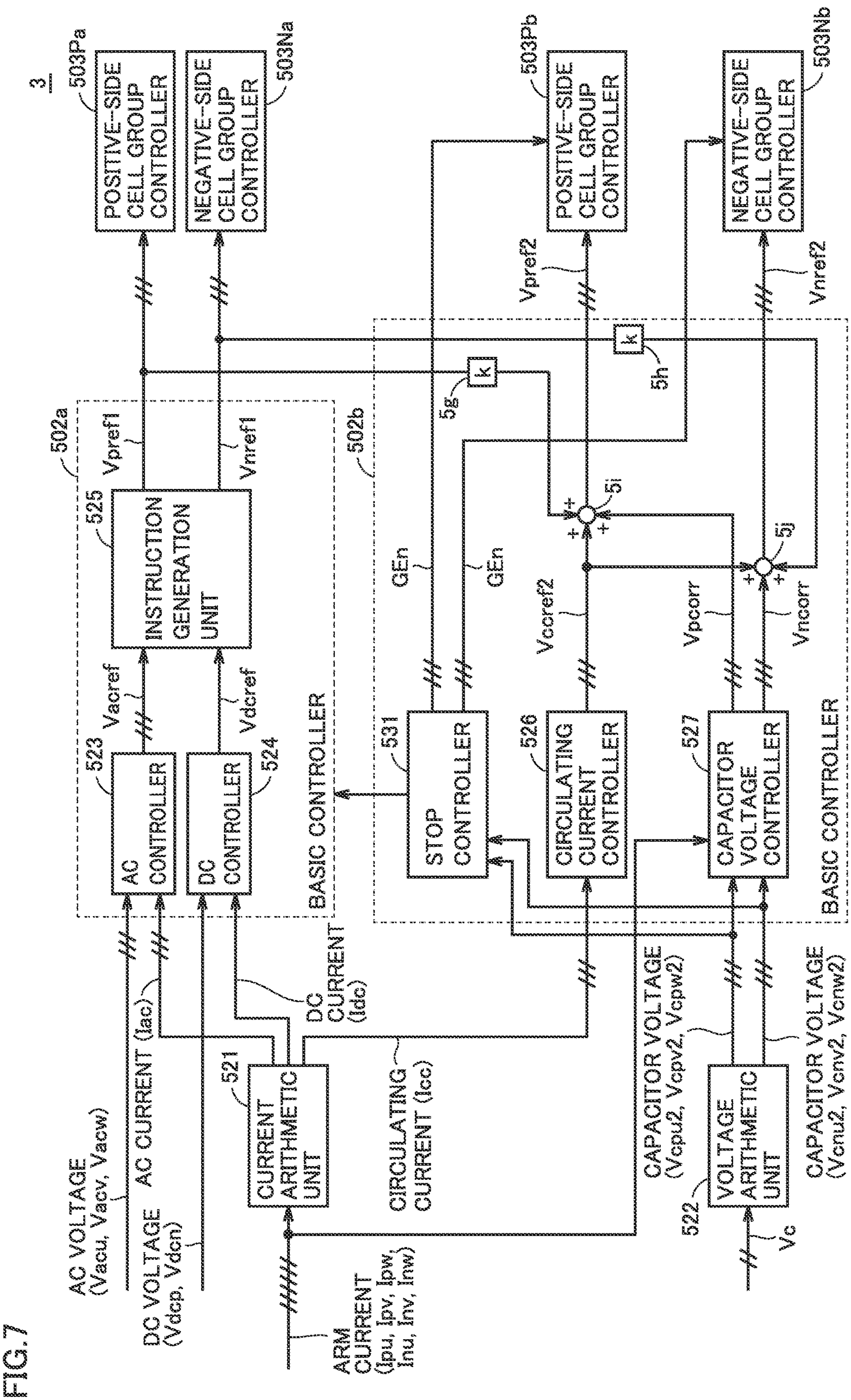
FIG. 7 is a view illustrating a configuration of a basic controller according to a third embodiment.

A configuration in which the arm current is increased by increasing the AC current while the switching operation of converter cell 7*b* is stopped will be described. In this case, in order to increase the current flowing through converter cell 7*b*, control device 3 controls each converter cell 7*a* of cell groups 51, 61 so as to increase the amplitude value of the AC current output from power conversion circuit unit 2. With reference to FIG. 7, the details will be described below.

FIG. 7 is a view illustrating a configuration of basic controller 502 according to the third embodiment. Basic controller 502*a* in FIG. 7 is different from basic controller 502*a* in FIG. 4 in that information indicating whether the switching operation of converter cells 7*b* of cell groups 52, 62 is stopped is received from stop controller 531.

With reference to FIG. 7, basic controller 502*a* receives information indicating that the switching operations of converter cells 7*b* of cell groups 52, 62 are stopped. When receiving the information, AC controller 523 of basic controller 502*a* generates AC voltage instruction value Vacref for increasing the amplitude value of the AC current output from power conversion circuit unit 2. In this case, instruction generation unit 525 generates voltage instruction values Vpref1, Vnref1 based on AC voltage instruction value Vacref, and cell groups 51, 61 are controlled by voltage instruction values Vpref1, Vnref1. Accordingly, the output AC current increases (that is, the arm current flowing through each leg circuit 4 increases), and capacitor 32 of converter cell 7*b* can be charged by the arm current.

At this point, when the AC current is output, at least one of the active power and the reactive power is transmitted and received between power conversion device 1 and AC circuit 12. First, the case of focusing on the active power will be described.

When AC circuit 12 is a three-phase AC system, generally, power for driving auxiliary machines including control device 3 and other devices (for example, a cooling device) is received from AC circuit 12. Accordingly, the AC power of AC circuit 12 is the total power of the active power output from power conversion device 1 to AC circuit 12 and the drive power for driving the auxiliary machine. When the distribution of the active power and the drive power is periodically changed while the total power is maintained, a time average value of the active power and the drive power can be maintained while the influence on AC circuit 12 is prevented. Furthermore, the active power output from power conversion device 1 is changed so as to increase the AC current output to AC circuit 12, so that the arm current flowing through each leg circuit 4 can be increased.

Specifically, AC controller 523 generates AC voltage instruction value Vacref for changing the active power so as to increase the amplitude value of the AC current output from power conversion circuit unit 2 while maintaining the total power. At this time, a ratio of the active power to the total power is periodically changed such that the time average value of the driving power of the auxiliary machine and the time average value of the active power do not change. Although the capacitor voltage at each converter cell 7*a* fluctuates with the change in the distribution of the driving power and the active power, this fluctuation is allowed because it is temporary when the capacitor voltage at converter cell 7*b* decreases.

Thereafter, when the capacitor voltage at converter cell 7*b* is restored, AC controller 523 receives information indicating that the switching operations of converter cells 7*b* of cell groups 52, 62 are restarted from stop controller 531. Upon receiving the information, AC controller 523 stops the processing for increasing the AC current, and generates AC voltage instruction value Vacref by normal feedback control.

As described above, while maintaining the total power of the drive power for driving the auxiliary machine and the active power output from power conversion circuit unit 2, control device 3 controls each converter cell 7*a* to change the active power so as to increase the amplitude value of the AC current.

The case of focusing on reactive power will be described below. When AC circuit 12 is an AC system, the output of the reactive power from power conversion device 1 to AC circuit 12 is assumed in order to stabilize the voltage at the AC system. At this time, in order to reduce device capacity (for example, the maximum value of the combined capacity of the available active power and the reactive power) of power conversion device 1, sometimes a reactive power compensation device such as a static var compensator (SVC) including a fast phase capacitor or a static synchronous compensator (STATCOM) is provided in parallel with power conversion device 1. For example, control device 3 is configured of being able to communicate with the reactive power compensation device, and transmits and receives various types of information.

For this reason, the reactive power supplied to AC circuit 12 is the total reactive power of reactive power Q1 output from power conversion device 1 to AC circuit 12 and reactive power Q2 output from the reactive power compensation device to AC circuit 12. The influence on AC circuit 12 can be suppressed by maintaining the total reactive power. Furthermore, by changing reactive power Q1 output from power conversion device 1, the arm current flowing through each leg circuit 4 can be increased so as to increase the AC current output to AC circuit 12.

Specifically, AC controller 523 generates AC voltage instruction value Vacref for changing reactive power Q1 such that the amplitude value of the AC current output from the power conversion circuit unit 2 increases while maintaining the total reactive power. The total reactive power is previously determined by a system operator. In addition, control device 3 (for example, AC controller 523) determines the distribution of reactive power Q1 and reactive power Q2 in cooperation with the reactive power compensation device.

Thereafter, AC controller 523 receives information indicating that the switching operations of converter cells 7*b* of cell groups 52, 62 are restarted from stop controller 531. Upon receiving the information, AC controller 523 stops the processing for increasing the AC current, and generates AC voltage instruction value Vacref by normal feedback control.

As described above, control device 3 changes reactive power Q1 controlling each converter cell 7*a* such that the amplitude value of the AC current output to the AC circuit 12 increases while maintaining the total reactive power of reactive power Q1 output from power conversion circuit unit 2 and reactive power Q2 output from the reactive power compensation device.

<Increase in DC Current>

Here, a configuration in which the arm current is increased by increasing the DC current while the switching operation of converter cell 7*b* is stopped will be described. In this case, in order to increase the current flowing through converter cell 7*b*, control device 3 controls each converter cell 7*a* of cell groups 51, 61 so as to increase the absolute value of the DC current output from power conversion circuit unit 2. With reference to FIG. 7, the details will be described below.

With reference to FIG. 7, basic controller 502*a* receives information indicating that the switching operations of converter cells 7*b* of cell groups 52, 62 are stopped. When receiving the information, DC controller 524 of basic controller 502*a* generates DC voltage instruction value Vdcref for increasing the absolute value of the DC current output from power conversion circuit unit 2. In this case, instruction generation unit 525 generates voltage instruction values Vpref1, Vnref1 based on DC voltage instruction value Vdcref, and cell groups 51, 61 are controlled by voltage instruction values Vpref1, Vnref1. Accordingly, the output DC current increases (that is, the arm current flowing through each leg circuit 4 increases), and capacitor 32 of converter cell 7*b* can be charged by the arm current.

However, in the case where the DC current is increased, when only the DC current flowing in one direction (for example, in the positive direction) is continuously increased, the capacitor voltage at each converter cell 7*a* fluctuates. Accordingly, it is desirable to periodically change the increase processing of the DC current flowing in the positive direction (that is, the direction from DC circuit 14 toward positive-side DC terminal Np) and the increase processing of the DC current flowing in the negative direction (that is, the direction from DC circuit 14 toward negative DC terminal Nn).

At this point, the DC power output from power conversion circuit unit 2 to DC circuit 14 when the DC current flows in the positive direction is denoted by Pdc1, and the DC power output from power conversion circuit unit 2 to DC circuit 14 when the DC current flows in the negative direction is denoted by Pdc2. In this case, the absolute value of the DC current is increased while the direction of the DC current is changed such that the difference between the time average value of DC power Pdc1 and the time average value of DC power Pdc2 becomes the desired DC power, so that the fluctuation of the capacitor voltage of each converter cell 7 can be prevented within a prescribed range to increase the arm current flowing to each leg circuit 4. The desired DC power may be a power value designated by the system operator or the instruction value that defines the DC power output from power conversion circuit unit 2 to DC circuit 14.

Specifically, DC controller 524 generates DC voltage instruction value Vdcref that changes the direction of the DC current output from power conversion circuit unit 2 and increases the absolute value of the DC current such that the difference between the time average value of DC power Pdc1 and the time average value of DC power Pdc2 becomes the desired DC power. Although the capacitor voltage at each converter cell 7*a* fluctuates with the change in the direction in which the DC current flows and the absolute value, this fluctuation is allowed because it is temporary when the switching operation of converter cell 7*b* is stopped.

Thereafter, when the capacitor voltage at converter cell 7*b* is returned, DC controller 524 receives information indicating that the switching operation of converter cell 7*b* of cell groups 52, 62 is restarted from stop controller 531. Upon receiving the information, DC controller 524 stops the processing for increasing the DC current, and generates DC voltage instruction value Vdcref by the normal feedback control.

As described above, control device 3 increases the absolute value of the DC current while the direction of the DC current is changed such that the difference between the time average value of DC power Pdc1 and the time average value of DC power Pdc2 becomes the desired DC power by controlling each converter cell 7*a*.

<Output of Circulating Voltage>

Figure 8:
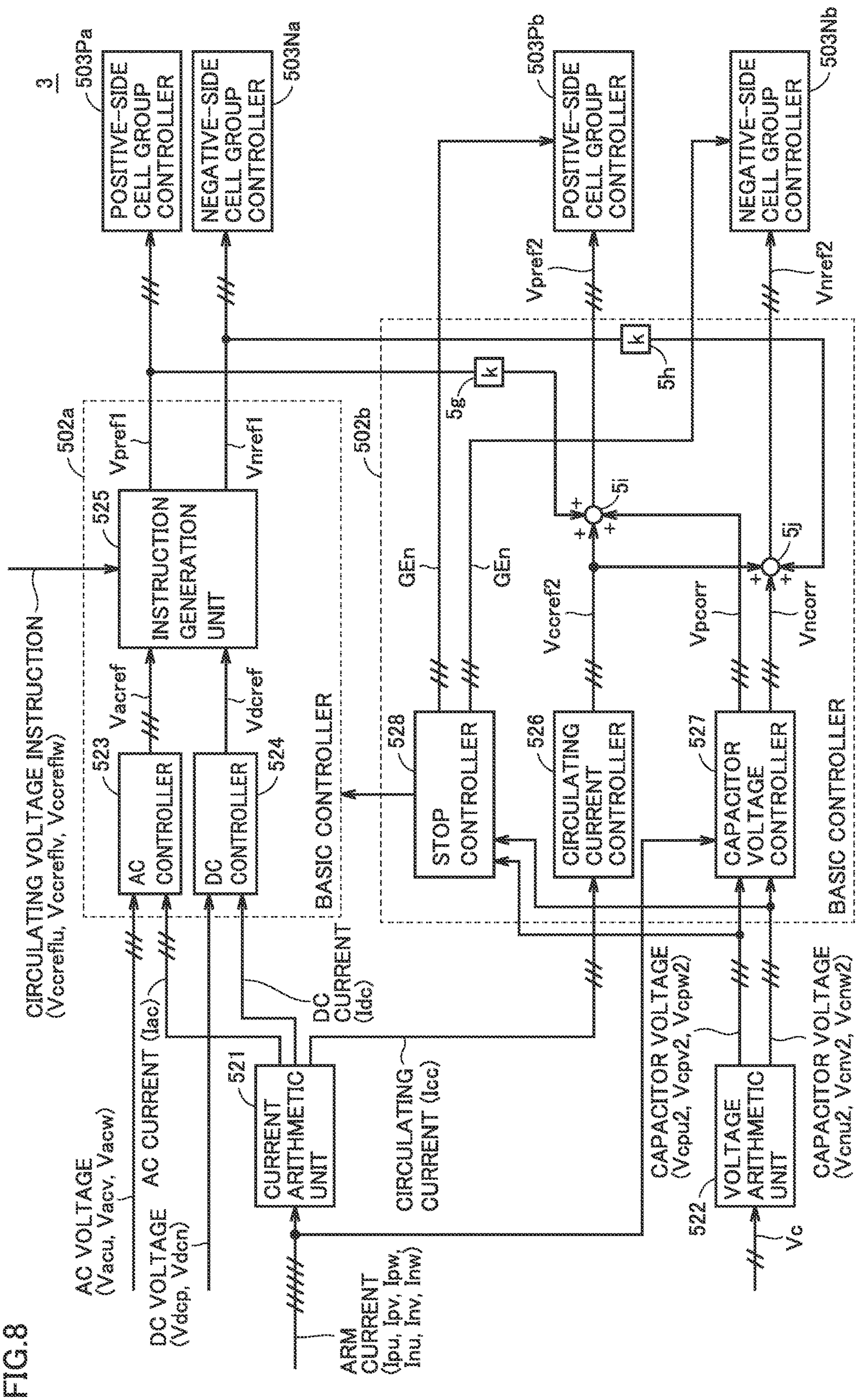
FIG. 8 is a view illustrating another configuration of the basic controller of the third embodiment.

Here, a configuration in which the arm current is increased by increasing the circulating current while the switching operation of converter cell 7*b* is stopped will be described. In this case, control device 3 controls cell groups 51, 61 such that the circulating voltage is output from cell groups 51, 61 in order to increase the circulating current. With reference to FIG. 8, the details will be described below.

FIG. 8 is a view illustrating another configuration of basic controller 502 according to the third embodiment. Basic controller 502*a* in FIG. 8 is different from basic controller 502*a* in FIG. 7 in that the basic controller 502*a* in FIG. 8 receives the input of the circulating voltage instruction value.

With reference to FIG. 8, basic controller 502*a* receives information indicating that the switching operations of converter cells 7*b* of cell groups 52, 62 are stopped. When receiving the information, instruction generation unit 525 of basic controller 502*a* generates voltage instruction values Vpref1, Vnref1 based on DC voltage instruction value Vdcref, AC voltage instruction value Vacref, and circulating voltage instruction value Vccref1. Specifically, voltage instruction values Vpref1u, Vpref1v, Vpref1w, Vnref1u, Vnref1v, Vnref1w are expressed as the following Equations (19) to (24). The following Equation (25) holds for the circulating voltage instruction value.

$$Vpref1u = Vdcref/2 - Vacrefu + Vccref1u \quad (19)$$

$$Vpref1v = Vdcref/2 - Vacrefv + Vccref1v \quad (20)$$

$$Vpref1w = Vdcref/2 - Vacrefw + Vccref1w \quad (21)$$

$$Vnref1u = Vdcref/2 + Vacrefu + Vccref1u \quad (22)$$

$$Vnref1v = Vdcref/2 + Vacrefv + Vccref1v \quad (23)$$

$$Vnref1w = Vdcref/2 + Vacrefw + Vccref1w \quad (24)$$

$$Vccref1u + Vccref1v + Vccref1w = 0 \quad (25)$$

From these equations, it is understood that circulating voltage instruction value Vccref1 does not contribute to fluctuation of AC voltage Vac and DC voltage Vdc.

When the circulating voltage instruction value is added and combined in this manner, because voltage instruction values Vpref1, Vnref1 outputting the circulating current as disturbance are supplied to cell groups 51, 61, the circulating current is generated, and as a result, the arm current flowing through each leg circuit 4 increases.

At this point, because the circulating current is the current that does not include AC circuit 12 and DC circuit 14 in the path, the influence on AC circuit 12 and DC circuit 14 is prevented even when the circulating current flows. However, when the circulating current including the DC component flows, the component related to the DC current output cannot be ignored, so that the average value of each phase of the capacitor voltages of cell groups 51, 61 varies. When the circulating current including a fundamental frequency component of AC circuit 12 flows, the component related to the AC current output cannot be ignored, so that the average value of the capacitor voltage of cell group 51 and the average value of the capacitor voltage of cell group 61 vary.

Accordingly, the circulating current to be generated is desirably the current including the fundamental frequency component of AC circuit 12 and a frequency component other than the DC component. Therefore, the circulating voltages output from cell groups 51, 61 are set so as not to include the fundamental frequency component and the frequency component of the DC component. Specifically, circulating voltage instruction values Vccref1 to cell groups 51, 61 are set so as not to include the fundamental frequency component and the frequency component of the DC component.

As described above, when the voltage instruction value to which circulating voltage instruction value Vccref1 is added is given to cell groups 51, 61, the arm current increases, so that the charge of capacitor 32 of converter cell 7*b* is promoted.

Thereafter, when the capacitor voltage at converter cell 7*b* is restored, instruction generation unit 525 receives information indicating that the switching operations of converter cells 7*b* of cell groups 52, 62 are restarted from stop controller 531. Upon receiving the information, instruction generation unit 525 generates voltage instruction values Vpref1, Vnref1 that do not add and combine circulating voltage instruction value Vccref1. That is, instruction generation unit 525 generates voltage instruction values Vpref1, Vnref1 based on DC voltage instruction value Vdcref and AC voltage instruction value Vacref.

<Change in Transformation Ratio>

Here, a configuration in which the arm current is increased by changing a transformation ratio of transformer 13 to increase the AC current while the switching operation of converter cell 7*b* is stopped will be described. In the following description, transformer 13 in FIG. 1 is a transformer with a variable transformation ratio. For example, the transformer of the variable transformation ratio is implemented by a transformer with a tap switching function. Control device 3 is configured of being able to communicate with transformer 13, and transmits various instructions such as an instruction to change the transformation ratio to transformer 13.

Because power conversion device 1 is connected to AC circuit 12 through transformer 13, the AC output current can be changed without affecting the AC output power and the DC output power by changing the transformation ratio of transformer 13. Thus, the charge of capacitor 32 of converter cell 7*b* can be promoted because arm current Iarm can be increased.

When determining that the capacitor voltage at converter cell 7*b* decreases, control device 3 changes the transformation ratio of transformer 13 in order to increase arm current Iarm. Specifically, an amplitude value of the AC current output from power conversion device 1 is increased by decreasing the ratio (that is, V2/V1) between a voltage V1 on the side of AC circuit 12 of transformer 13 and a voltage V2 on the side of power conversion device 1. Thus, the current flowing through converter cell 7*b* also increases because arm current Iarm increases. As a result, the charge of capacitor 32 of converter cell 7*b* is promoted.

As described above, control device 3 changes the transformation ratio of transformer 13 provided between AC circuit 12 and power conversion circuit unit 2 so as to increase the amplitude value of the AC current output from power conversion circuit unit 2. Thereafter, when the capacitor voltage at converter cell 7*b* is returned to restart the switching operation of converter cells 7*b* of cell groups 52, 62, control device 3 returns the transformation ratio of transformer 13 to the state before the change.

Advantages

According to the third embodiment, the increase in the AC current, the DC current, or the circulating current can increase the arm current, and shorten the charge time of the capacitor of converter cell 7*b*.

Other Embodiments (1) In the above-described embodiments, in each of reactors 8A, 8B, only positive-side reactor 8A or only negative-side reactor 8B may be provided in each leg circuit 4. When only negative-side reactor 8B is provided, cell group 52 for the circulating current control becomes unnecessary, and positive-side cell group controller 503Pb, adder 5*i*, and gain circuit 5*g* related to cell group 52 are also unnecessary. Therefore, there is an advantage that the configuration of control device 3 can be simplified. Similarly, when only positive-side reactor 8A is provided, cell group 62 for the circulating current control becomes unnecessary, and negative-side cell group controller 503Nb, adder 5*j*, and gain circuit 5*h* related to cell group 62 are also unnecessary. Therefore, there is an advantage that the configuration of control device 3 can be simplified.

(2) In the above-described embodiments, converter cells 7*a* constituting cell groups 51, 61 not for the circulating current control and each converter cells 7*b* constituting cell groups 52, 62 for the circulating current control have the same configuration. Alternatively, converter cells 7*a* constituting cell groups 51, 61 and converter cells 7*b* constituting cell groups 52, 62 may have different configurations.

(3) An example in which capacitor voltage controller 527 multiplies the output of the compensator by the polarity of arm current Iarm has been described in the above-described embodiments. However, the similar effect can be obtained by multiplying the output of the compensator by the current value of arm current Iarm instead of the polarity of arm current Iarm.

(4) The configuration in which it is determined that the capacitor voltage decreases when at least one of capacitor voltages Vcpu2, Vcpv2, Vcpw2, Vcnu2, Vcnv2, Vcnw2 is less than threshold Th1 has been described in the above-described embodiments. However, the configuration is not limited to the embodiments. For example, when the capacitor voltage of at least one converter cell 7*b* in all converter cells 7*b* included in each leg circuit 4 is less than threshold Th1, it may be determined that the capacitor voltage decreases. In this case, when the capacitor voltages at all converter cells 7*b* included in each leg circuit 4 become equal to or greater than threshold Th2, control device 3 may determine that the capacitor voltage is returned.

(5) In the above-described embodiments, the configuration in which control device 3 stops the switching operation of converter cell 7*b* when the capacitor voltage at converter cell 7*b* decreases has been described. However, limitation to the configuration is not intended. Instead of the control method for stopping the switching operation of converter cell 7*b* described in the first embodiment (hereinafter, also described as a "first control mode"), control device 3 may adopt a control method for performing the switching operation of converter cell 7*b* such that the same voltage as the output voltage during the stop of converter cell 7*b* is output (hereinafter, also referred to as a "second control mode").

The switching operation of converter cell 7*b* in the second control mode will be described. First, the case where converter cell 7*b* has the half-bridge configuration will be described. With reference to FIG. 2(*a*), when the arm current flows from input and output terminal P1 to input and output terminal P2, control device 3 controls switching element 31*p* to be turned on and switching element 31*n* to be turned off. On the other hand, when the arm current flows from input and output terminal P2 to input and output terminal P1, control device 3 controls switching element 31*p* to be turned off and switching element 31*n* to be turned on.

Next, the case where converter cell 7*b* has the full-bridge configuration will be described. With reference FIG. 2(*b*), when the arm current flows from input and output terminal P1 to input and output terminal P2, control device 3 controls switching elements 31*p*1, 31*n*2 to be turned on and switching elements 31*n*1, 31*p*2 to be turned off. On the other hand, when the arm current flows from input and output terminal P2 to input and output terminal P1, control device 3 controls switching elements 31*p*1, 31*n*2 to be turned off and switching elements 31*n*1, 31*p*2 to be turned on.

When the switching operation of converter cell 7*b* in the second control mode is controlled as described above, the change in the output voltage at converter cell 7*b* in the second control mode can be equalized to the change in the output voltage at converter cell 7*b* in the first control mode. Accordingly, when the capacitor voltage at converter cell 7*b* decreases, control device 3 may control at least one converter cell 7*b* in the second control mode instead of the first control mode. When the capacitor voltage at converter cell 7*b* is returned, control device 3 ends the second control mode and restarts the control switching converter cells 7*b* of cell groups 52, 62 based on the circulating current. In the second and third embodiments, control device 3 may adopt the second control mode.

(6) The configurations exemplified as the above-described embodiments are an example of the configuration of the present disclosure, and can be combined with another known technique, or can be modified, for example, partially omitted without departing from the gist of the present disclosure. In addition, in the above-described embodiments, the processing and configuration described in other embodiments may be appropriately adopted and implemented.

It should be considered that the disclosed embodiment is an example in all respects and not restrictive. The scope of the present disclosure is defined by not the description above, but the claims, and it is intended that all modifications within the meaning and scope of the claims and their equivalents are included in the present disclosure.

REFERENCE SIGNS LIST

1: power conversion device, 2: power conversion circuit unit, 3: control device, 4*u*, 4*v*, 4*w*: leg circuit, 5: positive-side arm, 5*g*, 5*h*: gain circuit, 5*i*, 5*j*: adder, 6: negative-side arm, 7*a*, 7*b*: converter cell, 8A, 8B: reactor, 9A, 9B: arm current detector, 10: AC voltage detector, 11A, 11B: DC voltage detector, 12: AC circuit, 13: transformer, 14: DC circuit, 16: AC current detector, 31*n*1, 31*n*2, 31*n*, 31*p*1, 31*p*2, 31*p*: switching element, 32: capacitor, 33: voltage detector, 34: bypass switch, 51, 52, 61, 62: cell group, 202: individual controller, 203: carrier signal generation unit, 501, 501*a*, 501*b*: switching controller, 502, 502*a*, 502*b*: basic controller, 503, 503*a*, 503*b*: cell group controller, 503Na, 503Nb: negative-side cell group controller, 503Pa, 503Pb: positive-side cell group controller, 521: current arithmetic unit, 522: voltage arithmetic unit, 523: AC controller, 524: DC controller, 525: instruction generation unit, 526: circulating current controller, 527: capacitor voltage controller, 531: stop controller, 533: adjustment unit

The invention claimed is:

1. A power conversion device that performs power conversion between a DC circuit and an AC circuit, the power conversion device comprising:

a power conversion circuit unit including a plurality of leg circuits corresponding to a plurality of phases of the AC circuit, each of the leg circuits including a plurality of first converter cells each having a capacitor and connected in series to each other and a plurality of second converter cells each having a capacitor and connected in series to each other; and a control device to control operations of the plurality of first converter cells and the plurality of second converter cells, wherein the plurality of first converter cells are controlled not based on a circulating current circulating between the plurality of leg circuits, and the plurality of second converter cells are controlled based on the circulating current, the control device controls at least one second converter cell in the plurality of second converter cells in a first mode or a second mode when a voltage at a capacitor in the second converter cell becomes less than a first threshold, the first mode is a mode for stopping a switching operation of a converter cell, and the second mode is a mode in which the converter cell is caused to perform the switching operation such that a change in an output voltage of the converter cell in the second mode becomes identical to a change in an output voltage of the converter cell in the first mode.

2. The power conversion device according to claim 1, wherein the control device stops the switching operation of the plurality of second converter cells in the first mode, or stops the switching operation of the second converter cell including the capacitor when the voltage at the capacitor becomes less than the first threshold.

3. The power conversion device according to claim 1, wherein the control device controls the plurality of first converter cells so as to increase an amplitude value of an AC current output from the power conversion circuit unit during the first mode or the second mode.

4. The power conversion device according to claim 3, wherein while maintaining total power of drive power for driving an auxiliary machine including the control device and active power output from the power conversion circuit unit, the control device controls the plurality of first converter cells to change the active power so as to increase the amplitude value of the AC current.

5. The power conversion device according to claim 3, wherein while maintaining total power of first reactive power output from the power conversion circuit unit and second reactive power output from a reactive power compensation device provided in parallel with the power conversion device, the control device controls the plurality of first converter cells to change the second reactive power so as to increase the amplitude value of the AC current.

6. The power conversion device according to claim 1, wherein the control device controls the plurality of first converter cells so as to increase an absolute value of a DC current output from the power conversion circuit unit during the first mode or the second mode.

7. The power conversion device according to claim 6, wherein the plurality of leg circuits are connected in parallel to each other between a high potential-side DC terminal and a low potential-side DC terminal, and the control device controls the plurality of first converter cells to increase the absolute value of the DC current while changing a direction of the DC current such that a difference between a time average value of first DC power output from the power conversion circuit unit to the DC circuit when a DC current flows from the DC circuit to the high potential-side DC terminal and a time average value of second DC power output from the power conversion circuit unit to the DC circuit when the DC current flows from the DC circuit to the low potential-side DC terminal becomes desired DC power.

8. The power conversion device according to claim 1, wherein the control device controls the plurality of first converter cells such that a circulating voltage for increasing the circulating current is output from the plurality of first converter cells in the first mode or the second mode.

9. The power conversion device according to claim 8, wherein the circulating voltage does not include a fundamental frequency component and a DC component of the AC circuit.

10. The power conversion device according to claim 1, wherein the control device changes a transformation ratio of a transformer provided between the AC circuit and the power conversion circuit unit so as to increase an amplitude value of an AC current output from the power conversion circuit unit during the first mode or the second mode.

11. The power conversion device according to claim 1, wherein when voltages at all the capacitors in the plurality of second converter cells become equal to or greater than a second threshold during the first mode or the second mode, the control device restarts control to cause the plurality of second converter cells to perform the switching operation based on the circulating current.

12. The power conversion device according to claim 11, wherein the control device sets an output voltage at a cell group including the plurality of second converter cells to an initial value of a voltage instruction value for the cell group at a time point of restarting the switching operation when the switching operation of the second converter cell is restarted, and the control device changes the voltage instruction value in a ramp shape from the initial value.

13. The power conversion device according to claim 11, wherein the second threshold is larger than the first threshold.

14. The power conversion device according to claim 2, wherein the control device controls the plurality of first converter cells so as to increase an amplitude value of an AC current output from the power conversion circuit unit during the first mode or the second mode.

15. The power conversion device according to claim 2, wherein the control device controls the plurality of first converter cells so as to increase an absolute value of a DC current output from the power conversion circuit unit during the first mode or the second mode.

16. The power conversion device according to claim 2, wherein the control device controls the plurality of first converter cells such that a circulating voltage for increasing the circulating current is output from the plurality of first converter cells in the first mode or the second mode.

17. The power conversion device according to claim 2, wherein the control device changes a transformation ratio of a transformer provided between the AC circuit and the power conversion circuit unit so as to increase an amplitude value of an AC current output from the power conversion circuit unit during the first mode or the second mode.

18. The power conversion device according to claim 2, wherein when voltages at all the capacitors in the plurality of second converter cells become equal to or greater than a second threshold during the first mode or the second mode, the control device restarts control to cause the plurality of second converter cells to perform the switching operation based on the circulating current.

19. The power conversion device according to claim 3, wherein when voltages at all the capacitors in the plurality of second converter cells become equal to or greater than a second threshold during the first mode or the second mode, the control device restarts control to cause the plurality of second converter cells to perform the switching operation based on the circulating current.

20. The power conversion device according to claim 4, wherein when voltages at all the capacitors in the plurality of second converter cells become equal to or greater than a second threshold during the first mode or the second mode, the control device restarts control to cause the plurality of second converter cells to perform the switching operation based on the circulating current.

* * * * *